United States Patent
Xue et al.

(10) Patent No.: US 11,889,517 B2
(45) Date of Patent: Jan. 30, 2024

(54) CONFIGURED CHASE-COMBINING RECEPTION FOR NEW RADIO (NR) SIDELINK MODE 1

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Tao Luo, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/308,714

(22) Filed: May 5, 2021

(65) Prior Publication Data
US 2022/0361216 A1    Nov. 10, 2022

(51) Int. Cl.
*H04W 72/23* (2023.01)
*H04W 72/1263* (2023.01)
*H04L 1/1867* (2023.01)
*H04W 72/044* (2023.01)
*H04L 1/1812* (2023.01)
*H04W 72/20* (2023.01)

(52) U.S. Cl.
CPC .......... *H04W 72/23* (2023.01); *H04L 1/1819* (2013.01); *H04L 1/1896* (2013.01); *H04W 72/0466* (2013.01); *H04W 72/1263* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2022/0225292 A1* | 7/2022 | Mohammad Soleymani | H04W 84/005 |
| 2022/0330261 A1* | 10/2022 | Yeo | H04W 72/0473 |
| 2022/0368467 A1* | 11/2022 | Liu | H04L 1/1822 |

FOREIGN PATENT DOCUMENTS

WO    WO-2020088609 A1 *    5/2020    ............ H04L 5/0053

* cited by examiner

*Primary Examiner* — Saumit Shah
(74) *Attorney, Agent, or Firm* — Norton Rose Fulbright US LLP/Qualcomm Incorporated

(57) ABSTRACT

This disclosure provides systems, methods, and devices for wireless communication that support configured reception with sidelink control information (SCI) repetition over a sidelink. In aspects, a receiving user equipment (UE) may be configured to conduct combined reception/decoding of SCI repetitions (received from a transmitting UE over a sidelink) over multiple time-frequency slots at pre-defined occasions (e.g., occasions configured by a base station) to decode a sidelink transmission. In aspects, a receiving UE may receive from a transmitting UE over a sidelink, a sidelink transmission during a reception occasion that includes a plurality of reception opportunities for the receiving UE. Each reception opportunity of the plurality of reception opportunities includes a repetition of an SCI. The receiving UE decodes the SCI by combining the repetitions of the SCI received in one or more reception opportunities, and decodes a data transmission (e.g., a physical sidelink shared channel (PSSCH) transmission) using the decoded SCI.

30 Claims, 12 Drawing Sheets

CONFIGURED CHASE-COMBINING RECEPTION FOR NEW RADIO (NR) SIDELINK MODE 1

TECHNICAL FIELD

Aspects of the present disclosure relate generally to wireless communication systems, and more particularly, to configured reception with sidelink control information (SCI) repetitions over a sidelink.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a first user equipment (UE), from a second UE over a sidelink, a sidelink transmission during a reception occasion that includes a plurality of reception opportunities for the first UE. In aspects, each reception opportunity of the plurality of reception opportunities includes a repetition of a sidelink control information (SCI) message transmitted by the second UE. The method further includes decoding the SCI message. In aspects, decoding the SCI message includes combining the repetition of the SCI message received in one or more reception opportunities of the plurality of reception opportunities. The method also includes decoding a data transmission, received from the second UE over the sidelink, using the decoded SCI message.

In an additional aspect of the disclosure, a method of wireless communication includes receiving, by a first UE from a base station, a transmission grant to transmit a sidelink transmission to a second UE. In aspects, the transmission grant specifies resources in which the first UE is to transmit the sidelink transmission, and the sidelink transmission includes a data transmission and an SCI message. The method also includes transmitting, by the first UE, the sidelink transmission to the second UE over a sidelink based on the transmission grant, the sidelink transmission transmitted during at least one reception occasion of the second UE. In aspects, each reception occasion of the at least one reception occasion includes a plurality of reception opportunities for the second UE, and transmitting the sidelink transmission includes repeating the SCI message in each reception opportunity of the plurality of reception opportunities of the at least one reception occasion. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure a method of wireless communication includes transmitting, by a base station, a transmission grant to a first UE to transmit a sidelink transmission to a second UE during at least one reception occasion of the second UE. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, an apparatus configured for wireless communication is disclosed. The apparatus includes at least one processor, and a memory coupled to the at least one processor. The at least one processor is configured to perform operations including receiving, by a first UE, from a second UE over a sidelink, a sidelink transmission during a reception occasion that includes a plurality of reception opportunities for the first UE. In aspects, each reception opportunity of the plurality of reception opportunities includes a repetition of an SCI message transmitted by the second UE. The operations further include decoding the SCI message. In aspects, decoding the SCI message includes combining the repetition of the SCI message received in one or more reception opportunities of the plurality of reception opportunities. The operations also include decoding a data transmission, received from the second UE over the sidelink, using the decoded SCI message.

In an additional aspect of the disclosure, an apparatus configured for wireless communication is disclosed. The apparatus includes at least one processor, and a memory coupled to the at least one processor. The at least one processor is configured to perform operations including receiving, by a first UE from a base station, a transmission grant to transmit a sidelink transmission to a second UE. In aspects, the transmission grant specifies resources in which the first UE is to transmit the sidelink transmission, and the sidelink transmission includes a data transmission and an SCI message. The operations further include transmitting, by the first UE, the sidelink transmission to the second UE over a sidelink based on the transmission grant, the sidelink transmission transmitted during at least one reception occasion of the second UE. In aspects, each reception occasion of the at least one reception occasion includes a plurality of reception opportunities for the second UE, and transmitting the sidelink transmission includes repeating the SCI message in each reception opportunity of the plurality of reception opportunities of the at least one reception occasion. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, an apparatus configured for wireless communication is disclosed. The apparatus includes at least one processor, and a memory coupled to the at least one processor. The at least one processor is configured to perform operations including transmitting, by a base station, a transmission grant to a first UE to transmit a sidelink transmission to a second UE during at least one reception occasion of the second UE. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, a non-transitory computer-readable medium stores instructions that, when executed by a processor, cause the processor to perform operations including receiving, by a first UE, from a second UE over a sidelink, a sidelink transmission during a reception occasion that includes a plurality of reception opportunities for the first UE. In aspects, each reception opportunity of the plurality of reception opportunities includes a repetition of an SCI message transmitted by the second UE. The operations further include decoding the SCI message. In aspects, decoding the SCI message includes combining the repetition of the SCI message received in one or more reception opportunities of the plurality of reception opportunities. The operations also include decoding a data transmission, received from the second UE over the sidelink, using the decoded SCI message.

In an additional aspect of the disclosure, a non-transitory computer-readable medium stores instructions that, when executed by a processor, cause the processor to perform operations including receiving, by a first UE from a base station, a transmission grant to transmit a sidelink transmission to a second UE. In aspects, the transmission grant specifies resources in which the first UE is to transmit the sidelink transmission, and the sidelink transmission includes a data transmission and an SCI message. The operations further include transmitting, by the first UE, the sidelink transmission to the second UE over a sidelink based on the transmission grant, the sidelink transmission transmitted during at least one reception occasion of the second UE. In aspects, each reception occasion of the at least one reception occasion includes a plurality of reception opportunities for the second UE, and transmitting the sidelink transmission includes repeating the SCI message in each reception opportunity of the plurality of reception opportunities of the at least one reception occasion. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, a non-transitory computer-readable medium stores instructions that, when executed by a processor, cause the processor to perform operations including transmitting, by a base station, a transmission grant to a first UE to transmit a sidelink transmission to a second UE during at least one reception occasion of the second UE. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, an apparatus configured for wireless communication is disclosed. The apparatus includes means for receiving, by a first user equipment (UE), from a second UE over a sidelink, a sidelink transmission during a reception occasion that includes a plurality of reception opportunities for the first UE. In aspects, each reception opportunity of the plurality of reception opportunities includes a repetition of a sidelink control information (SCI) message transmitted by the second UE. The apparatus further includes means for decoding the SCI message. In aspects, the means for decoding the SCI message include means for combining the repetition of the SCI message received in one or more reception opportunities of the plurality of reception opportunities. The apparatus also includes means for decoding a data transmission, received from the second UE over the sidelink, using the decoded SCI message.

In an additional aspect of the disclosure, an apparatus configured for wireless communication is disclosed. The apparatus includes means for receiving, by a first UE from a base station, a transmission grant to transmit a sidelink transmission to a second UE. In aspects, the transmission grant specifies resources in which the first UE is to transmit the sidelink transmission, and the sidelink transmission includes a data transmission and an SCI message. The apparatus also includes means for transmitting, by the first UE, the sidelink transmission to the second UE over a sidelink based on the transmission grant, the sidelink transmission transmitted during at least one reception occasion of the second UE. In aspects, each reception occasion of the at least one reception occasion includes a plurality of reception opportunities for the second UE, and the means for transmitting the sidelink transmission include means for repeating the SCI message in each reception opportunity of the plurality of reception opportunities of the at least one reception occasion. In aspects, the second UE is configured to combine the repetition of the SCI message transmitted in one or more reception opportunities of the plurality of reception opportunities to decode the SCI message, and to decode the data transmission using the decoded SCI message.

In an additional aspect of the disclosure, an apparatus configured for wireless communication is disclosed. The apparatus includes means for transmitting, by a base station, a transmission grant to a first UE to transmit a sidelink transmission to a second UE during at least one reception occasion of the second UE. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities. In aspects, the second UE is configured to combine the repetition of the SCI message transmitted in one or more reception opportunities of the plurality of reception opportunities to decode the SCI message, and to decode the data transmission using the decoded SCI message.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
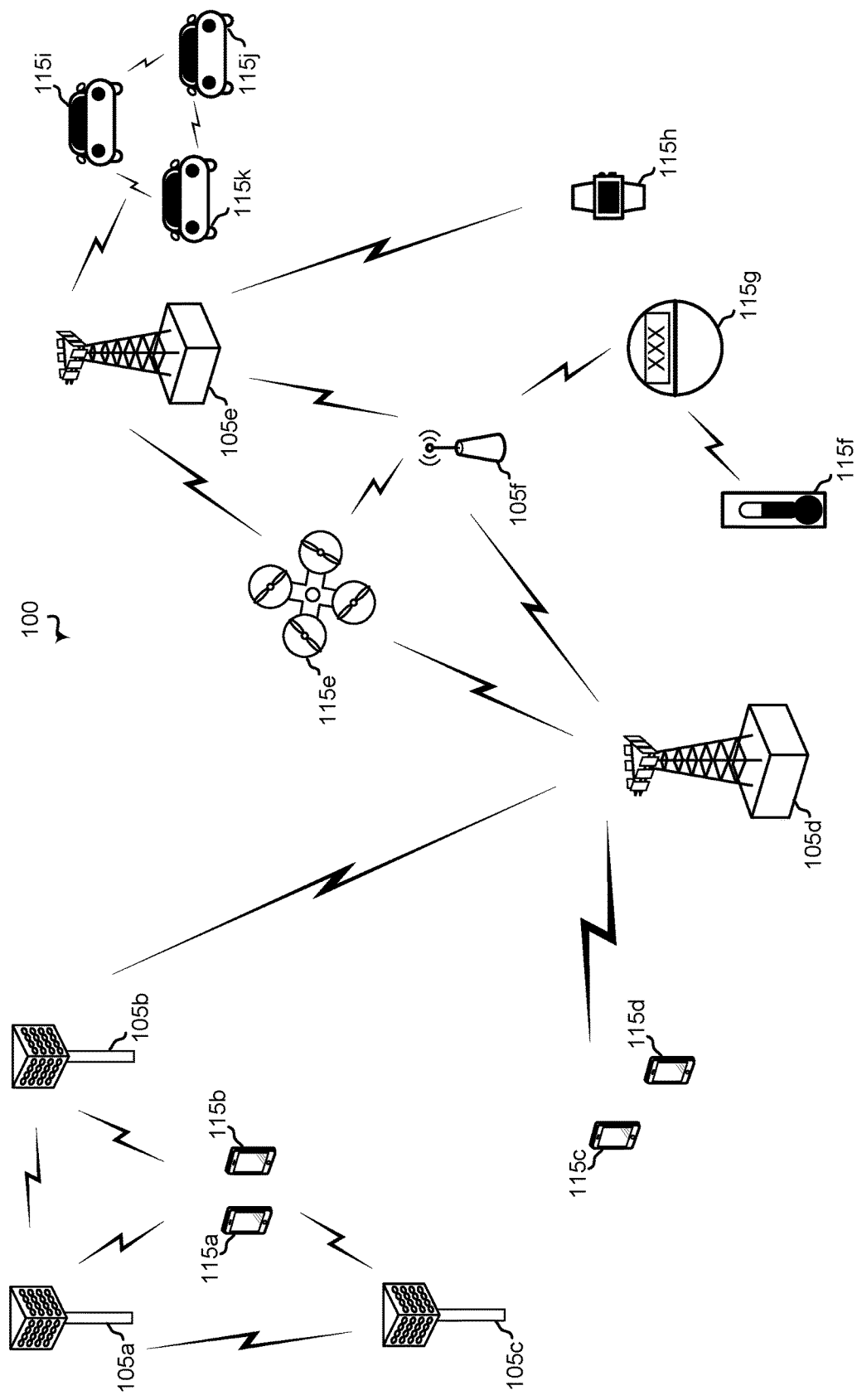
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation Various aspects of the present disclosure relate to techniques that supports configured reception with sidelink control information (SCI) repetition over a sidelink in a wireless communication system. In particular, in aspects of the present disclosure, a receiving user equipment (UE) may be configured or scheduled to conduct combined reception/decoding of SCI repetitions (received from a transmitting UE over a sidelink) over multiple time-frequency slots at pre-defined occasions (e.g., occasions configured by a base station) to decode a sidelink link that may be very difficult, if not impossible otherwise. In aspects, a receiving UE may receive from a transmitting UE over a sidelink, a sidelink transmission during a reception occasion that includes a plurality of reception opportunities for the receiving UE. In aspects, each reception opportunity of the plurality of reception opportunities includes a repetition of an SCI message transmitted by the transmitting UE. In aspects, the receiving UE decodes the SCI message by combining the repetitions of the SCI message received in one or more reception opportunities of the plurality of reception opportunities. The receiving UE then decodes a data transmission (e.g., a physical sidelink shared channel (PSSCH) transmission) received from the transmitting UE over the sidelink using the decoded SCI message.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3 GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., —99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
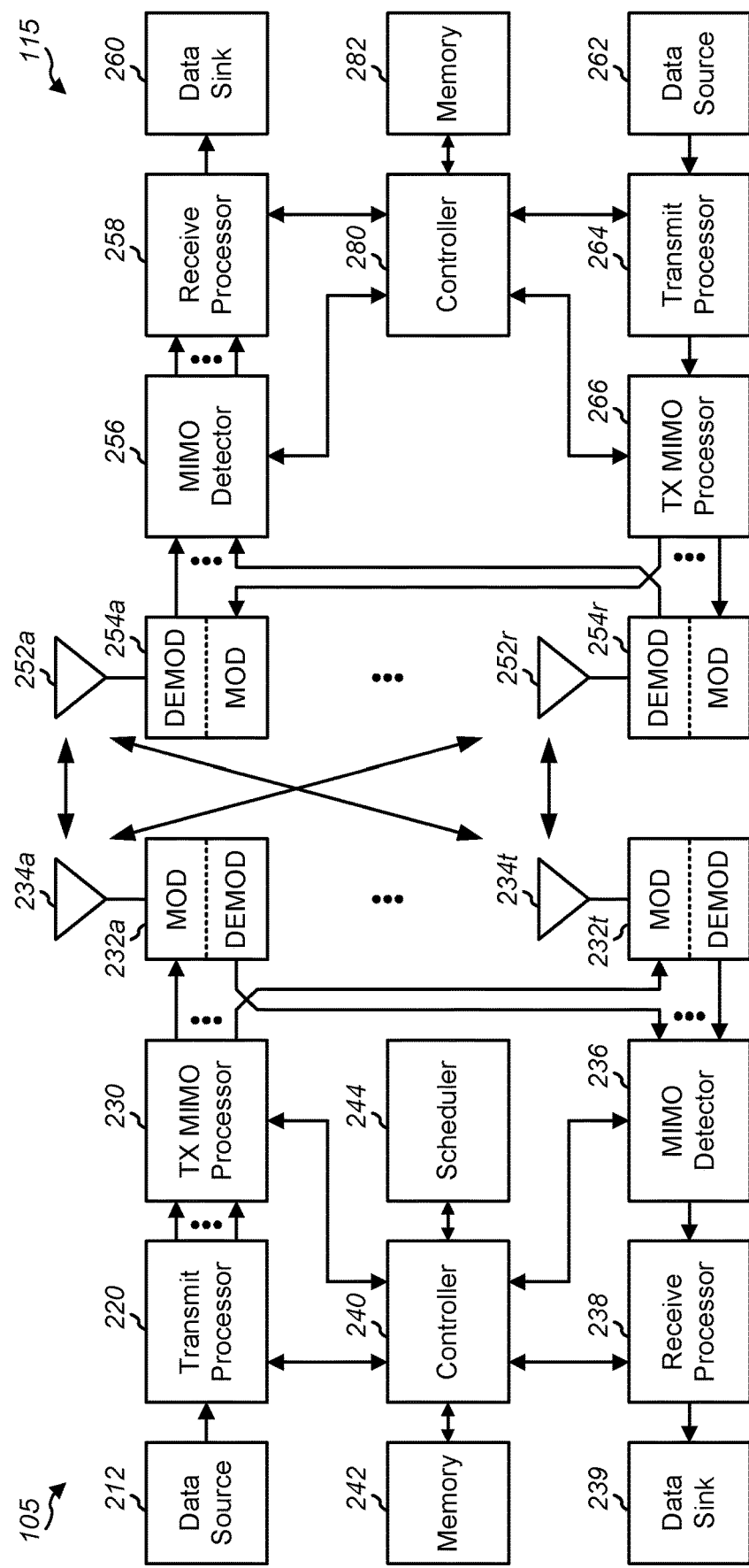
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8-10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications may be particularly useful in Internet of Things (IoT) and/or vehicle-to-everything (V2X) application, in which delivering safety related messages in a sub-6 GHz licensed bands is particularly important.

In some implementations, SL communications between two UEs may operate in one of various modes. In particular, two modes for channel/resource allocation have been specified in current wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, once the transmission grant is received by the transmitting UE, the transmitting UE may transmit sidelink control information (SCI) to the receiving UE (e.g., using the resources specified in the transmission grant from the base station). In implementations, the SCI may carry control coding points intended for the receiving UE (or receiving UEs), as well as other information intended for channel busy ratio measurement. In some cases, the SCI may include a reservation field to reserve up-to two future sidelink transmissions. In implementations, the SCI may transmitted over a physical sidelink control channel (PSCCH) and may be configured to indicate to the receiving UE a sidelink data transmission from the transmitting UE over a physical sidelink shared channel (PSSCH). In implementations, the receiving UE may, after receiving the PSSCH transmission, provide feedback (e.g., over a physical SL feedback channel (PSFCH)).

In order to support a wide range of deployments, sidelink mode 1 is typically deployed without specifying direct or tight control of the sidelink receiving UE by the base station that issues the transmission grant to the sidelink transmitting UE. For example, the sidelink receiving UE may be served by another base station (e.g., a base station different from the base station that issues the transmission grant to the sidelink transmitting UE), or may be in a non-connected mode. In these cases, the receiving UE may decode the SCI received from the transmitting UE by applying a blind decoding up to its capability. This process provides the receiving UE with the flexibility needed by V2X applications. However, the same process is not optimized for situations when direct or tight control of the receiving UE is actually possible.

It is noted that in current systems, not every vertical domain has access to sub-6 GHz licensed bands and even those vertical domains having access to sub-6 GHz licensed band may be seeking opportunities in other bands, e.g., the 60 GHz unlicensed band and/or the new 6 GHz band. However, coverage in these unlicensed bands may be poorer than in sub-6 GHz licensed bands. For example, a higher frequency carrier may have a larger path loss exponent, regulators may impose stricter transmit power limits for incumbent protection (e.g., a very lower power (VLP) for the 6 GHz unlicensed band), and/or beamforming alignment may be in general needed to achieve reasonable coverage over these unlicensed bands. When a communication system implements sidelink mode 1 with a radio interface (Uu) over a sub-6 GHz licensed band and a sidelink interface (e.g., PC5 interface) over a high-frequency unlicensed band (e.g., the 60 GHz unlicensed band and/or the new 6 GHz band), it may be possible that both the transmitting UE and the receiving UE(s) are in coverage of the same base station, at least for low-rate signaling connections. However, it is also likely that the transmitting UE and the receiving UE may be struggling to maintain a reliable sidelink link.

Figure 3:
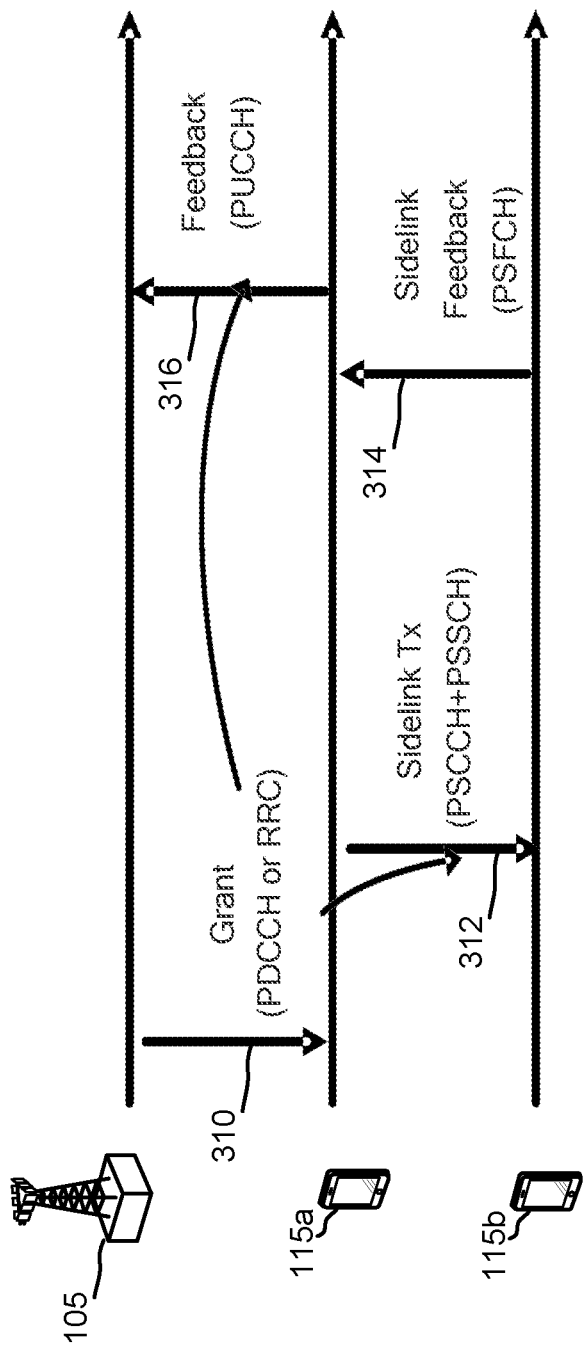
FIG. 3 is a diagram illustrating an example of a sidelink transmission in sidelink mode 1.

FIG. 3 is a diagram illustrating an example of a sidelink transmission in sidelink mode 1. As shown in FIG. 3, base station 105 may transmit a transmission grant 310 to UE 115a, such as in a PDCCH transmission or via a radio resource control (RRC) message. In some cases, transmission grant 310 may specify resources for transmitting a sidelink transmission 312 from UE 115a to UE 115b over a sidelink. In implementations, the sidelink transmission 312 may include control information (e.g., a PSCCH transmission (e.g., including SCI)) and/or a sidelink data transmission (e.g., a PSSCH transmission). UE 115a may transmit sidelink transmission 312 to UE 115b in accordance with transmission grant 310. UE 115b may receive the sidelink transmission 312 and may decode the SCI (e.g., using blind decoding) and, based on the SCI, may decode the PSSCH transmission to obtain the sidelink data transmitted. In implementations, UE 115b, after receiving sidelink transmission 312 may transmit an optional feedback message 314 (e.g., in a PSFCH transmission) to UE 115a with an ACK or a NACK, as appropriate. In some cases, such as when a NACK is received from UE 115b by UE 115a, UE 115a may determine to request, to base station 105, to retransmit the sidelink transmission to UE 115b. In these cases, UE 115a may transmit feedback 316 (e.g., via a PUCCH transmission) to base station 105 including a NACK. In this case, base station 105 may send another transmission grant to UE 115a granting sidelink retransmissions.

In the example described above, the sidelink transmission grant 310 is issued by base station 105 to UE 115a based on information provided by UE 115a (e.g., a sidelink buffer status, etc.), and with relatively looser control that compared to a non-sidelink communication session. In this case, it is up to UE 115a (e.g., the sidelink transmitting UE) to determine who the receiving UE(s) is/are, and also which modulation and coding scheme (MCS) to use for the sidelink transmission. In implementations, UE 115a may insert control code points in the SCI message for the intended sidelink receiver(s). In addition, the SCI may carry additional information to facilitate the receiving UE(s) to conduct measurements and decoding.

As noted above, UE 115b may conduct blind decoding of the SCI. In some cases, the blind decoding may be in accordance, and up to, UE 115b's capabilities. For example, UE 115 may attempt to blindly and/or independently (e.g., using a one-shot reception approach) decode an SCI at each candidate sub-channel in the sidelink resource pool associated with the sidelink transmission 310. However, this blind decoding approach using a one-shot reception is a very complicated process that results in high power-usage and affects the UE's battery life, and even more, does not taken into account situation in which no perfect decoding is available. Furthermore, one-shot reception may not provide enough signal-to-interference-and-noise ratio (SINR) over a weak sidelink (e.g., a sidelink affected by power or blocking).

Various aspects of the present disclosure relate to techniques that supports configured reception with SCI repetition over a sidelink in a wireless communication system. In aspects, a sidelink transmitting UE may be configured for SCI repetitions, in which an SCI message associated with a sidelink data transmission (e.g., a PSCCH transmission) may be repeatedly transmitted. In aspects, repeating the SCI transmission may enable a receiving UE to accumulate and/or combine the SCI repetitions (e.g., using chase combining or other combining techniques) and provide an improved process for decoding the SCI. In addition, or in the alternative, the sidelink transmission between the transmitting UE and the receiving UE may be conducted using configured reception, in which the receiving UE is configured to focus on particular resources (e.g., in accordance with a configured reception configuration received from the base station) for receiving the SCI repetitions and/or the sidelink data transmission.

For example, in aspects, a receiving UE may be configured or scheduled to conduct combined reception/decoding of SCI repetitions (received from a transmitting UE over a sidelink) over multiple time-frequency slots at pre-defined occasions (e.g., occasions configured by a base station) to decode a sidelink link that may be very difficult, if not impossible, to decode otherwise. In aspects, the combined reception/decoding of the SCI repetitions may include a base station configuring a receiving UE to conduct configured reception of a sidelink transmission from a transmitting UE that includes SCI repetitions in each of a plurality of reception opportunities of each period configured reception occasion to search for and decode the SCI that may not be decoded otherwise (e.g., without the configured reception and/or SCI repetitions). In aspects, a configuration of the configured reception may include specification of pre-specified time-frequency resources and/or specified processing configuration.

In particular aspects, a receiving UE may receive from a transmitting UE over a sidelink, a sidelink transmission during a reception occasion that includes a plurality of reception opportunities for the receiving UE. In aspects, each reception opportunity of the plurality of reception opportunities includes a repetition of an SCI message transmitted by the transmitting UE. In aspects, the receiving UE decodes the SCI message by combining the repetitions of the SCI message received in one or more reception opportunities of the plurality of reception opportunities. The receiving UE then decodes a data transmission (e.g., a physical sidelink shared channel (PSSCH) transmission) received from the transmitting UE over the sidelink using the decoded SCI message.

Figure 4:
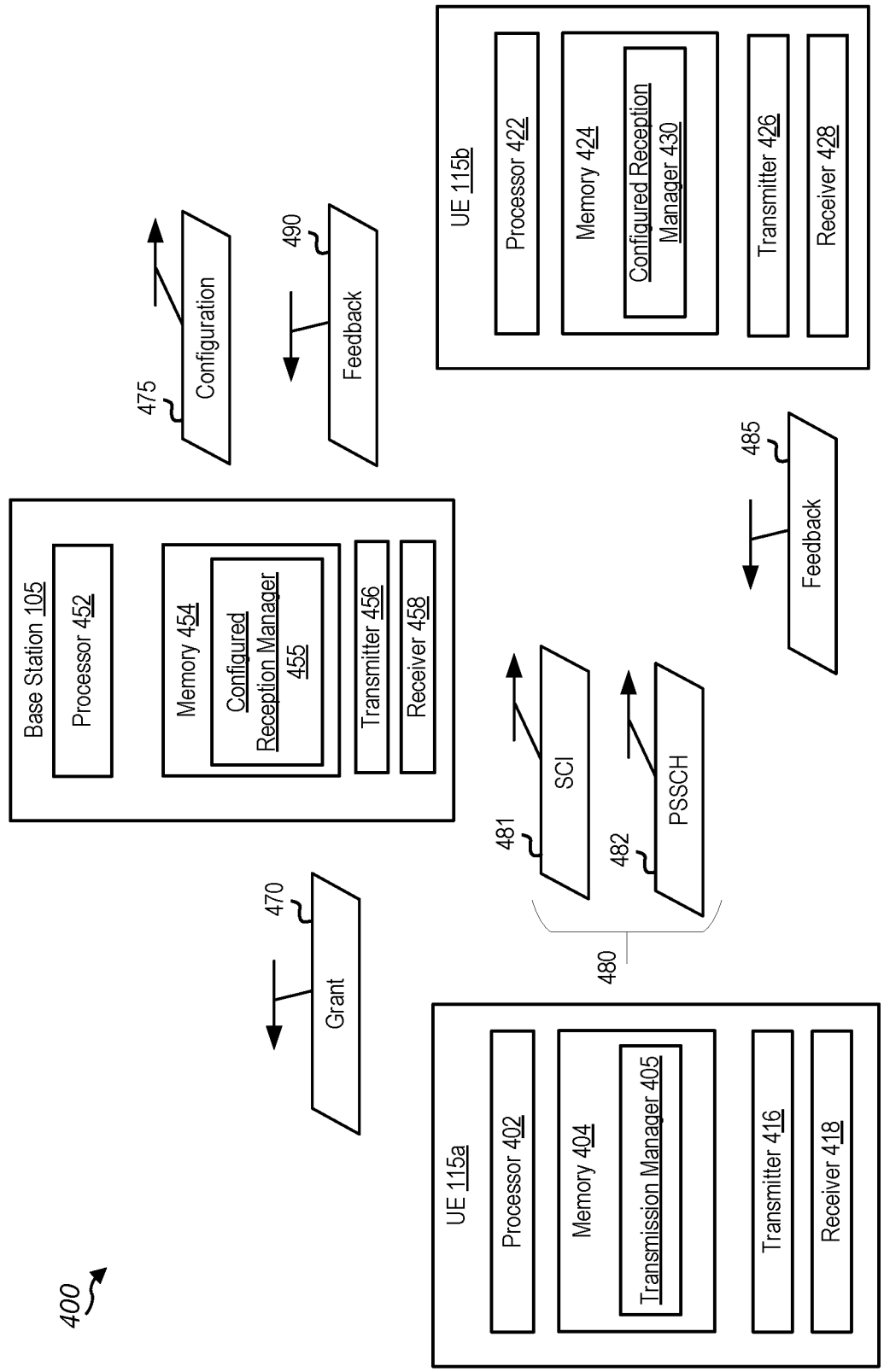
FIG. 4 is a block diagram of an example wireless communications system that supports configured reception with sidelink control information (SCI) repetition over a sidelink in a wireless communication system according to one or more aspects.

FIG. 4 is a block diagram of an example wireless communications system 400 that supports configured reception with SCI repetition over a sidelink in a wireless communication system according to one or more aspects. In some examples, wireless communications system 400 may implement aspects of wireless network 100. Wireless communications system 400 includes UE 115a, UE 115b, and base station 105, and may implement a sidelink mode 1. In aspects, UE 115a and UE 115b may be in communication over a sidelink. UE 115a and UE 115b may also each be in communication with base station 105. In the discussion that follows, UE 115a may be described as a transmitting UE and UE 115b may be described as a receiving UE, and in this context UE 115a may transmit data to UE 115b (e.g., an SCI over a PSCCH and data over a PSSCH). Also in this context, base station 105 may transmit a transmission grant to UE 115a, and may configure UE 115b for configured reception in accordance with aspects of the present disclosure. However, this description of UE 115a as a transmitting UE and UE 115b as a receiving UE, as well as the description of system 400 as including two UEs and one base station, is merely for illustrative purposes and not intended to be limiting in any way. As such, wireless communications system 400 may generally include multiple UEs 115, and may include more than one base station 105.

UE 115a may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store transmission manager 405. In aspects, transmission manager 405 may be configured to perform operations for configuring and/or scheduling a sidelink transmission to be transmitted to UE 115a. In aspects, these operations may include requesting and/or receiving transmission grant 470 from base station 105 specifying resources for the sidelink transmission (e.g., including configured reception configurations defining occasions including opportunities in which to include an SCI repetition), generating and/or transmitting the SCI and an associated PSSCH transmission, and/or configuring the SCI repetitions to be transmitted to the UE 115b. In aspects, UE 115a may be configured to include an SCI repetition in each configured reception opportunity of each configured reception occasion. In aspects, the configuration of UE 115a to include the SCI repetitions in the configured reception opportunities may be based on transmission grant 470 received from base station 105, which may include a configured reception configuration associated with receiving UE 115b.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

UE 115b also may include a variety of components (such as structural, hardware components) used for carrying out one or more functions described herein. For example, these components may include one or more processors 422 (hereinafter referred to collectively as "processor 422"), one or more memory devices 424 (hereinafter referred to collectively as "memory 424"), one or more transmitters 426 (hereinafter referred to collectively as "transmitter 426"), and one or more receivers 428 (hereinafter referred to collectively as "receiver 428"). Processor 422 may be configured to execute instructions stored in memory 424 to perform the operations described herein. In some implementations, processor 422 includes or corresponds to one or more of receive processor 258, transmit processor 264, and controller 280, and memory 424 includes or corresponds to memory 282.

Memory 424 includes or is configured to store configured reception manager 430. In aspects, configured reception manager 405 may be configured to perform operations for conducting configured reception of SCI repetitions, for decoding the SCI based on the configured reception of the SCI repetitions, and/or to decode a sidelink data transmission (e.g., a PSSCH) received from UE 115a. In aspects, these operations may include requesting and/or receiving configured reception configuration 475 from base station 105 specifying resources (e.g., occasions including opportunities) in which SCI repetitions may be included by transmitting UE 115a when transmitting an SCI message over the sidelink between UE 115a and 115b. In aspects, the operations also include combining (e.g., chase combining) the SCI repetitions received in the multiple opportunities of each configured reception occasion to decode the SCI message. UE 115b may then use the information in the decoded SCI message to decode the sidelink data transmission (e.g., a PSSCH) received from UE 115a. In aspects, configured reception manager 405 may also be configured to transmit a feedback message (e.g., a hybrid automatic repeat request (HARM) feedback message) to base station 105.

Transmitter 426 is configured to transmit reference signals, control information and data to one or more other devices, and receiver 428 is configured to receive references signals, synchronization signals, control information and data from one or more other devices. For example, transmitter 426 may transmit signaling, control information and data to, and receiver 428 may receive signaling, control information and data from, base station 105. In some implementations, transmitter 426 and receiver 428 may be integrated in one or more transceivers. Additionally or alternatively, transmitter 426 or receiver 428 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store configured reception manager 455. In aspects, configured reception manager 455 may be configured to perform operations for configuring and/or scheduling a sidelink transmission between UE 115a and UE 115b. In aspects, configured reception manager may be configured to send a transmission grant 470 to UE 115a specifying resources for a sidelink data transmission to be transmitted to UE 115b. The transmission grant 470 may include a configured reception configuration that may define configured reception occasions including multiple opportunities in each of which UE 115a may include an SCI repetition of an SCI message to be transmitted to UE 115b. In aspects, configured reception manager 455 may also be configured to send configured reception configuration 475 to UE 115b, specifying a configured reception configuration for UE 115b to receive the SCI repetitions from UE 115a, and which UE 115b may use to combine (e.g., by chase combination) the SCI repetitions received in the multiple opportunities of each configured reception occasion from UE 115a to decode the SCI message, and then to decode the sidelink data transmission (e.g., a PSSCH) received from UE 115a using the decided SCI. In aspects, configured reception manager 450 may also be configured to receive a feedback message (e.g., a HARQ feedback message) from UE 115b.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

Figure 6:
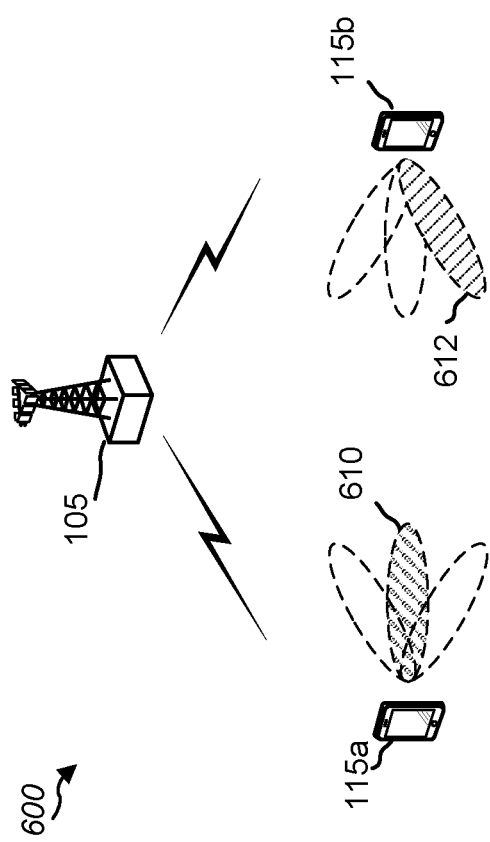
FIG. 6 is a diagram illustrating a sidelink communication between two UEs in a non-stationary environment.

One particular example of a use case scenario for configured reception with SCI repetition over a sidelink relates to a non-stationary sidelink communication environment, as illustrated in FIG. 6. FIG. 6 is a diagram illustrating a sidelink communication between two UEs in a non-stationary environment. Wireless communication system 600 may include base station 105, UE 115a, and UE 115b. As shown, UE 115a and 115b may be in sidelink communications. In this example, either UE 115a or UE 115b, or both, may be non-stationary. As such, perfect beamforming alignment may not be possible between UE 115a and 115b, especially when carrying low duty-cycle IoT traffic. For example, beam 610 and beam 612 may not be aligned. In this case, aligning the beams using beamforming alignment per packet arrival may require expending too many resources. However, in this case, applying PSSCH/SCI repetition to the transmissions from UE 115a to UE 115b in accordance with aspects herein may address the issues due to the beam misalignment and may not require expending too many resources. It is noted that in this case, the repeated PSSCH/SCI may be transmitted from the same source, namely UE 115a, and may include using different spatial relations for transmitter-side diversity.

Referring back to FIG. 4, during operation of wireless communications system 400, base station 105 transmit configured reception configuration 475 to UE 115b. Configured reception configuration 475 may be transmitted from base station 105 to UE 115b via a downlink control information (DCI) message, an RRC (e.g., Type 1) message, and/or an RRC+DCI (e.g., Type 2) message. In aspects, configured reception configuration 475 may configure UE 115b to perform or conduct configured reception of a subsequent sidelink transmission from UE 115a. In aspects, the configured reception configuration 475 may specify a processing setup of UE 115b to receive the subsequent sidelink transmission from UE 115a. The configured reception configuration 475 may specify periodic configured reception occasions in which UE 115b may receive the subsequent sidelink transmission from UE 115a. Each configured reception occasion may include multiple opportunities for reception. In aspects, configured reception configuration 475 may configure UE 115b to conduct combination (e.g., chase-combination) reception over the multiple opportunities in a configured reception occasion. In these aspects, UE 115b may be configured to obtain an SCI repetition transmitted in each of the multiple opportunities within a configured reception occasion, and to then combine the SCI repetitions to decode the SCI message.

Figure 5:
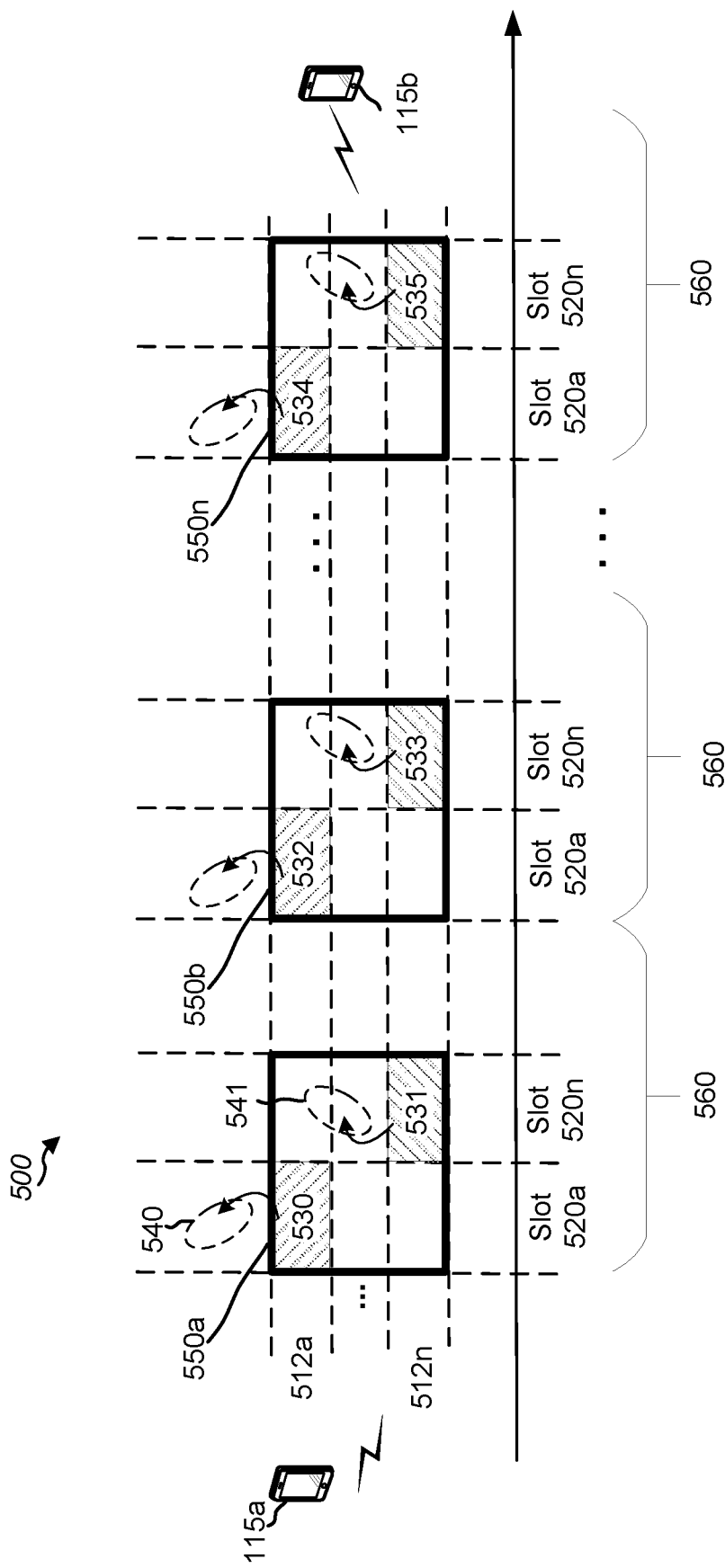
FIG. 5 is a diagram illustrating a configured reception configuration with SCI repetition in accordance with aspects of the present disclosure.

FIG. 5 is a diagram illustrating a configured reception configuration with SCI repetition in accordance with aspects of the present disclosure. As shown in FIG. 5, configured reception configuration 500 may include periodic configured reception occasions 550a-550n, having periodicity 560. In aspects, each configured reception occasion may be an occasion in which UE 115b may receive a sidelink transmission from 115a. In aspects, each configured reception occasion of configured reception occasions 550a-550n may span a number of sub-channels 512a-512n, and a number of slots 520a-520n. It is noted that although two slots 520a-520n are illustrated in FIG. 5, a configured reception occasion may span any number of slots and therefore the discussion with respect to two slots should not be construed as limiting in any way.

Each periodic configured reception occasion of configured reception occasions 550a-550n may include multiple opportunities for reception. For example, configured reception occasion 550a may include opportunities 530 and 531, configured reception occasion 550b may include opportunities 532 and 533, and configured reception occasion 550n may include opportunities 534 and 535. In aspects, the location of each opportunity in a configured reception occasion may be defined by a sub-channel and a slot index. For example, opportunity 530 in configured reception occasion 550a may be defined by sub-channel 512a's index and by slot 520*a*'s index, and opportunity 531 in configured reception occasion 550*a* may be defined by sub-channel 512*n*'s index and by slot 520*n*'s index. In this manner, UE 115*b* may be configured to evaluate each of the multiple opportunities in a configured reception occasion to obtain an SCI repetition transmitted in each of the multiple opportunities. For example, UE 115*b* may be configured to obtain an SCI repetition from each of opportunities 530 and 531 and to attempt to decode the SCI message transmitted by UE 115*a* in configured reception occasion 550*a* from these SCI repetitions by combining the SCI repetitions.

In some aspects, each opportunity within a configured reception occasion may be associated with a quasi-colocated (QCL) source, and in this manner, by repeating the SCI message in each opportunity, beam misalignment may be addressed. In some cases, the QCL source for each opportunity may be the same, or may be different. For example, opportunity 530 of configured reception occasion 550*a* may be associated with QCL source 540, and opportunity 531 of configured reception occasion 550*a* may be associated with QCL source 541 different from QCL source 540.

Referring back to FIG. 4, during operation of wireless communications system 400, base station 105 transmits a transmission grant 470 to UE 115*a*. In aspects, transmission grant 470 may grant UE 115*a* a grant to transmit a sidelink transmission to UE 115*b* during at least one configured reception occasion of UE 115*b*. In these aspects, base station 105 may base transmission grant 470 on the configured reception configuration of UE 115*b*. In this manner, base station 105 may configure UE 115*a* (e.g., via transmission grant 470) to transmit the sidelink transmission in a particular configured reception occasion, as configured for the receiving UE 115*b*. In aspects, transmission grant 470 may be dynamic grant or a configured grant. In either case, UE 115*a* may be granted to transmit a sidelink transmission to UE 115*b* on the granted resources, which may include the at least one configured reception occasion.

In aspects, the sidelink transmission to be transmitted from UE 115*a* to UE 115*b* may include a sidelink data transmission (e.g., a PSSCH transmission) and an SCI message associated with the PSSCH transmission. For example, the SCI message may include information to be used by the receiving UE (e.g., UE 115*b*) to decode the PSSCH transmission. In aspects, UE 115 may be scheduled (e.g., by transmission grant 470) to transmit the SCI message using SCI repetition by transmitting a repetition of the SCI message in each opportunity of the configured reception occasion in which UE 115*a* has been granted to transmit the sidelink transmission to UE 115*b*.

During operation of wireless communications system 400, UE 115*a* transmits sidelink transmission 480 to UE 115*b* over a sidelink. Sidelink transmission 480 may be transmitted to UE 115*b* during at least one configured reception occasion of UE 115*b*, in accordance with the configured reception configuration of UE 115*b*. In aspects, sidelink transmission 480 may include PSSCH transmission 482 and SCI message 481. SCI message 481 may include information the be used by the receiving UE (e.g., UE 115*b*) to decode PSSCH transmission 482. As mentioned above, SCI message 481 may be transmitted by UE 115*a* using SCI repetition. In this case, an SCI repetition is transmitted in each of multiple opportunities of the at least one configured reception occasion. For example, with reference to FIG. 5, UE 115*a* may transmit the SCI message 481 in configured reception occasion 520 a and may include a repetition of the SCI message 481 in each of opportunities 530 and 531. In some aspects, UE 115*a* may also transmit PSSCH transmission 482 within a resource of configured reception occasion 520.

Referring back to FIG. 4, during operation of wireless communications system 400, UE 115*b* receives sidelink transmission 480 from UE 115*a* over the sidelink. As noted above, sidelink transmission 480 may be received by UE 115*b* during the at least one configured reception occasion. In addition, an SCI repetition of SCI message 481 may be received in each of the multiple opportunities of the at least one configured reception occasion. In this manner, UE 115*b* may, for at least one opportunity, obtain the SCI repetition and attempt to decode the SCI message based on the obtained repetitions. In aspects, UE 115*b* may be configured to perform a combination procedure (e.g., a chase combination procedure) over the multiple opportunities. For example, UE 115*b* may combine the obtained SCI repetitions transmitted in the multiple opportunities of the at least one configured reception occasion and may decode the SCI message based on the combination procedure.

During operation of wireless communications system 400, UE 115*b* may decode PSSCH transmission 482 based on the decoded SCI message. In aspects, the decoded SCI message may include an indication of the location of the PSSCH transmission 482, and may also include information for decoding the PSSCH transmission 482. In aspects, PSSCH transmission 482 may also be repeated in each opportunity in which the SCI message is repeated. In this manner, the SCI repetition procedure described herein also includes a repetition of the PSSCH transmission in each opportunity of the configured reception occasion. In aspects, PSSCH transmission 482 may be transmitted in the same configured reception occasion in which the SCI message was transmitted (e.g., in the configured reception occasion in which the multiple opportunities carrying the SCI repetitions were transmitted), although in a different opportunity. In other aspects, PSSCH transmission 482 may be transmitted to UE 115*b* in another configured reception occasion. During operation of wireless communications system 400, UE 115*b* may transmit a feedback message 485 to UE 115*a* indicating either a NACK or an ACK. In some aspects, UE 115*b* may transmit a feedback message 490 to base station 105 indicating either a NACK or an ACK with respect to sidelink transmission 480.

In aspects, the combination procedure (e.g., the chase combining) over the multiple opportunities of the at least one configured reception occasion may be based on information associated with individual opportunities of the multiple opportunities. On each configured reception occasion, UE 115*b* may assign one sidelink process for processing all opportunities. In these aspects, UE 115*b* may assume that the SCI repetitions (and/or the PSSCH transmission repetitions) transmitted in each opportunity are the same. Therefore, being the same repetition indicates that the log likelihood ratio (LLR) of each repetition is the same. In this case, the repetitions in each opportunity may be chase-combined. However, the QCL source of different opportunities may be the same, or may be different. For example, with reference to FIG. 5, the QCL source 540 associated with opportunity 530 of configured reception occasion 550*a* may be different from the QCL source 541 associated with opportunity 531. In this case, UE 115 may be configured to measure a reference signal received power (RSRP) of a demodulation reference signal (DMRS) over each of the multiple opportunities. UE 115*b* may then attempt to decode the SCI repetition in an opportunity (e.g., may include the SCI repetition in the chase-combination) when the measured RSRP over that opportunity is larger than a predetermined threshold. In some aspects, UE 115b may deem an opportunity over which the measured RSRP is larger than the predetermined threshold as a qualified opportunity. In these aspects, UE 115b may attempt to decode (e.g., using chase-combining) the SCI using any sub-set of the opportunities deemed as qualified opportunities. In aspects, once UE 115b obtains a valid SCI message (e.g., an SCI message that UE 115b determines to be a valid SCI message such as by determining that the SCI message has a 16-bit destination ID that is matched to the ID of its layer 2 (L2) ID), UE 115b may follow the indication in the valid SCI message to decode the PSSCH transmission (e.g., PSSCH transmission 482).

In aspects, UE 115b may be configured perform or determine an early SCI decoding. In aspects, UE 115 may begin attempting to decode the SCI message from the first opportunity in which the SCI repetitions are received (e.g., opportunity 530), or, as mentioned above, in the first (e.g., earliest) opportunity that is deemed to be a qualified opportunity. At each attempted opportunity, UE 115b may determine whether a valid SCI message has been decoded. If UE 115b determines that a valid SCI message has been decoded or obtained, UE 115b may use the decoded SCI message to decode the PSSCH transmission. In response to successfully decoding the PSSCH transmission using the decoded SCI message, UE 115b may terminate the reception and may skip or forego any remaining opportunities and may not continue to attempt SCI decoding over the remaining opportunities. In some aspects, UE 115b may use the successfully decoded PSSCH to generate an early feedback (e.g., ACK) message that may be transmitted before the last opportunity carrying an SCI repetition. In aspects, when UE 115b determines that a valid SCI message has not been decoded or obtained at a given opportunity, UE 115b may store the LLRs obtained so far and may continue to the next qualified opportunity.

For example, SCI repetitions of the SCI message may be included in each of multiple opportunities 530 and 531 of configured reception occasion 550a. As shown, opportunity 530 may occur earlier (e.g., in an earlier slot) than opportunity 531. UE 115 may begin attempting to decode the SCI message from the opportunity 530. UE 115b may determine whether a valid SCI message has been decoded at opportunity 530. If UE 115b determines that a valid SCI message has been decoded or obtained, UE 115b may use the decoded SCI message to decode the PSSCH transmission and to generate a feedback message, and may not proceed to attempt to decode the SCI message at opportunity 531 (e.g., may exclude the SCI repetition in opportunity 531 from the combination procedure). However, if UE 115b determines that a valid SCI message has not been decoded or obtained at opportunity 530, UE 115b may proceed to attempt to decode the SCI message at opportunity 531 (e.g., may include the SCI repetition in opportunity 531 from the combination procedure). It should be noted that although the early decoding example described above with respect to FIG. 5 is illustrated with two opportunities, the same process is applicable with more than two opportunities, and so should not be construed as limiting. In these cases, early decoding may be applied when the accumulated SCI repetitions may result in a successful decoding of a valid SCI, in which case the remaining opportunities may be skipped, as described above.

Figure 7:
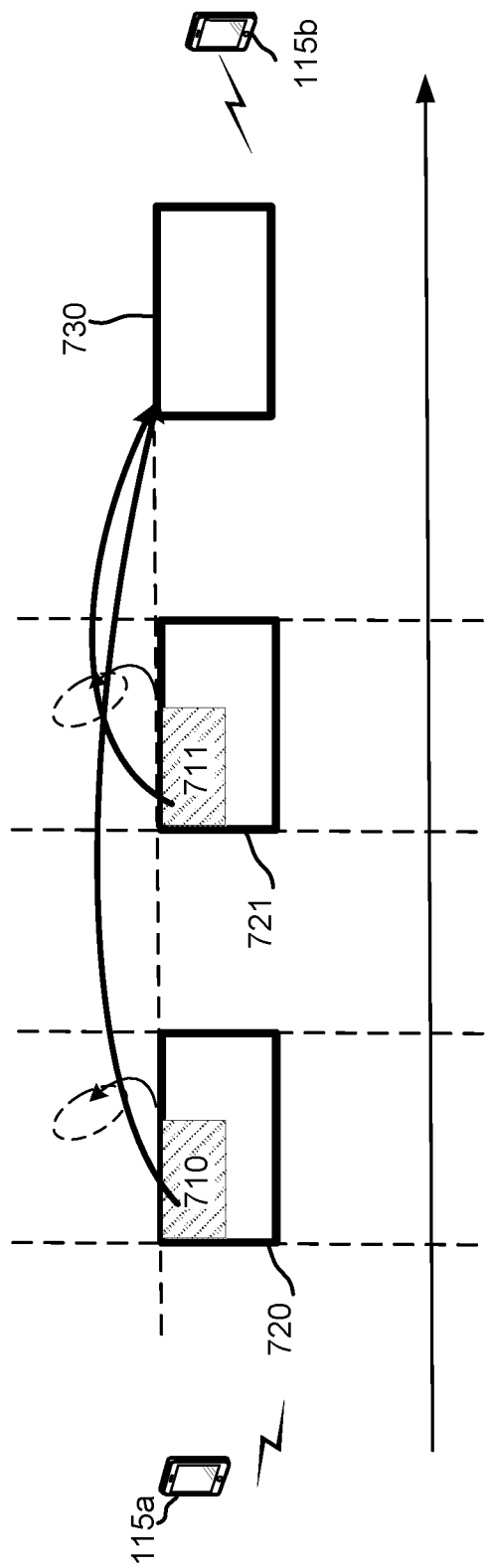
FIG. 7 shows a diagram illustrating an example of an SCI reserved retransmission in accordance with aspects of the present disclosure.

In aspects, as described above, the SCI repetitions in the multiple opportunities may include the same SCI content (e.g., may be repetitions of the same SCI message) in order to facilitate the combination procedure (e.g., chase-combining). Aspects of the present disclosure provide a mechanism for handling a reservation field of the SCI message to ensure that the combination reception may be performed adequately. These aspects will be discussed with reference to FIG. 7 FIG. 7 shows a diagram illustrating an example of an SCI reserved retransmission in accordance with aspects of the present disclosure. As shown in FIG. 7, UE 115b may receive repetitions 710 and 711 of the SCI message in each of opportunities 720 and 721. As noted above, UE 115b may be configured to combine the repetitions in opportunities 720 and 721 to decode the SCI message. In one aspects, the reservation field of the SCI message in each of the SCI repetitions 710 and 711 in opportunities 720 and 721 may be set to a null pointer (e.g., effectively disabling sidelink transmission reservation). This null-pointer approach is effective in situations in which the SCI message is repeated in sufficient opportunities such that the SCI message may be effectively decoded. For example, the two SCI repetitions in opportunities 720 and 721 may be sufficient to yield a valid SCI message when the SCI repetitions are combined (e.g., chase combined). In this case, the SCI repetitions in opportunities 720 and 721 may carry a null pointer in their respective reservation fields.

However, in some cases, the number of opportunities in which the SCI message is repeated may not be sufficient to obtain or decode a valid SCI message. For example, a valid SCI message may not be obtained even when the two SCI repetitions in opportunities 720 and 721 are combined (e.g., chase combined). In these cases, more SCI repetitions or SCI retransmissions may be needed in order to effectively decode the SCI message. In some other cases, ultra-reliability may be desired/required and in this case, more SCI repetitions beyond the number of opportunities in a configured reception occasion may be desired/required. In aspects, further retransmissions beyond the number of opportunities in the configured reception occasion may be configured by configuring the reservation field of the SCI message in each repetition to include a value corresponding to an anchor opportunity of the at least one configured reception occasion. For example, the reservation field of SCI repetition 710 and the reservation field of SCI repetition 711 in opportunities 720 and 721, respectively, may include a value corresponding to opportunity 721. In this case, at least one retransmission 730 may be anchored to the time-frequency resource of opportunity 721. In aspects, UE 115b may be configured with a default anchored opportunity, and in some aspects, the default anchor opportunity may be overridden by an active value in the SCI message (e.g., an active value in the SCI message being transmitted in the current configured reception occasion).

As noted above, (and as shown in FIG. 4), in some aspects, UE 115b may be configured to generate and transmit a feedback message 485 to UE 115a (e.g., over a PSFCH) indicating either a NACK or an ACK associated with the PSSCH transmission. Various aspects of the present disclosure provide various techniques for managing the feedback procedure when there are more than one qualified opportunities in which the PSSCH and SCI are transmitted that contribute to the SCI decoding (e.g., in the SCI repetition combination procedure described above). In some aspects, the SCI repetition received at each qualified opportunity may be considered as an independent SCI message. In these aspects, UE 115b may be configured to transmit a feedback message (e.g., a HARQ feedback message) for each qualified opportunity. In some cases, this means that UE 115b may transmit duplicated feedback responses over multiple PSFCH opportunities. In other aspects, UE 115b may be configured to generate and transmit a single feedback message for the repeated SCI message. In these aspects, each SCI repetition is not considered an independent SCI message. In some aspects, UE 115b may transmit the feedback message to UE 115a in the next occurring (e.g., the soonest) PSFCH opportunity. In some case, the next occurring PSFCH opportunity may be missed, such as in the case where a higher priority PSFCH message may pre-empt the single feedback message, or in the case of blocking due to a listen-before-talk (LBT) procedure. In this situation, UE 115b may be configured to transmit (or attempt to transmit) the single feedback message in the following PSFCH opportunity. If the following PSFCH opportunity is also not available, UE 115b may be configured to continue attempting a following PSFCH opportunity. In some aspects, UE 115b may be configured to transmit the feedback message to UE 115a in the last PSFCH opportunity available.

In some aspects, UE 115b may be configured to, when transmitting the feedback message in a PSFCH, set a QCL source in accordance with various aspects. In one aspects, UE 115b may transmit the feedback message in the PSFCH setting a QCL equal to the QCL that is used in the current opportunity. In another aspects, UE 115b may be configure to transmit the feedback message in the PSFCH setting a QCL equal to the QCL that is used in the opportunity with the largest DMRS RSRP. As noted above, UE 115b may measure the DMRS RSRP for each opportunity. In this case, the measured DMRS RSRP may be used to determine the opportunity with the largest DMRS RSRP. UE 115b may then set the QCL to equal the QCL of that opportunity when transmitting the feedback message in the PSFCH.

As noted above, (and as shown in FIG. 4), in some aspects, UE 115b may be configured to generate and transmit a feedback message 490 to base station 105 indicating either a NACK or an ACK associated with the PSSCH transmission from UE 115a. In these aspects, UE 115b may be configured with PUCCH resources for transmitting the feedback message 490 to base station 105. It is noted that in some aspects, UE 115b may not be configured to transmit a feedback message to base station 105. In some aspects, UE 115b may be configured to transmit an ACK or NACK message to base station 105 at the last opportunity. In other aspects, UE 115b may be configured to transmit an ACK or NACK message to base station 105 as a late feedback message. In aspects, a late feedback message may be transmitted after the configured reception occasion in which the opportunities occur, and at a time based on the multiple opportunities and any scheduled retransmissions.

In other aspects, UE 115b may be configured to transmit only ACK messages to base station 105 at the last opportunity, and ACK or NACK messages as a late feedback message. In other aspects, UE 115b may be configured to transmit only an ACK message after each opportunity. This technique may be especially useful in early decoding or for fast ACK, as an ACK may be transmitted after any opportunity if appropriate. In other aspects, UE 115b may be configured to transmit only an ACK message after each opportunity, but may be configured to transmit an ACK or NACK message for the last opportunity. This technique may be especially useful in early decoding or for fast ACK, as well as useful when SCI reservation may be disabled or no reservations are made in the SCI reservation field. In other aspects, UE 115b may be configured to transmit only an ACK message after each opportunity, but may be configured to transmit an ACK or NACK message to base station 105 as a late feedback message. This technique may be especially useful in early decoding or for fast ACK, as well as useful when SCI reservation may be used in the SCI repetitions.

In aspects, when a configured reception configuration as configured by base station 105 includes no more than three opportunities per configured reception occasion, the base station may issue a single transmission grant (e.g., a dynamic grant or a configured grant) to transmitting UE 115a based on the configured reception configuration in order to schedule the transmission of the SCI repetitions in each of the three opportunities. For example, current implementations of wireless communication systems may implement an SCI format that includes a reservation field in which up to two reservations may be made for sidelink retransmissions. In light of this, in a single grant, a total of three sidelink transmission, which may be used by UE 115a to transmit SCI repetitions, may be granted to UE 115a by base station 105.

In aspects, base station 105 may transmit the sidelink transmission grant to UE 115a in a DCI message (e.g., a DCI 3-0 message), which may be formatted to grant three sidelink transmissions. In aspects according to the present disclosure, the DCI message transmitted from base station 105 to UE 115a granting the sidelink transmissions may include a field indicating to UE 115a to insert a null pointer in the reservation field of the repeated SCI message. In other aspects, the DCI message transmitted from base station 105 to UE 115a granting the sidelink transmissions may include a field indicating to UE 115a to insert a reservation value corresponding to an anchor opportunity, as described above. In this case, the reservation field of each SCI repetition may include a retransmission reservation (for a retransmission outside of the at least one configured reception occasion) with respect to a time-frequency resource of one of the opportunities. In aspects, the reservation field in the DCI message transmitted from base station 105 to UE 115a may not always be copied to the SCI message of the first transmission.

In aspects, when a configured reception configuration as configured by base station 105 includes more than three opportunities per configured reception occasion, the base station may issue a plurality of DCI messages granting the sidelink transmission that includes the SCI message and PSSCH to be repeated. In aspects, each of the DCI messages in the plurality of DCI messages may be coupled to each other. For example, in aspects, each DCI may grant up to three sidelink transmissions (e.g., one for each SCI repetition) and the DCI may be coupled such that UE 115a may be indicated to transmit the same transport block (TB) over all granted PSSCHs with SCI repetition.

In aspects, even when UE 115b may be configured by base station 105 with the configured reception configuration for supporting the SCI repetition, there may be no transmitting UEs available to transmit a sidelink transmission with SCI repetition leveraging the configured reception configuration of UE 115b. In these aspects, base station 105 may reschedule any resources configured for a configured reception occasion to another sidelink. In aspects, in order to suppress unnecessary feedback messages from UE 115b (e.g., NACK messages) to base station 105 due to UE 115b not receiving a sidelink transmission from a transmitting UE, UE 115b may be configured to send a feedback message only after identifying a valid SCI message. In aspects, an SCI message may be considered valid only if the SCI message is included in a pre-defined set of valid SCI messages that may be transmitted to UE 115b (e.g., in configured reception configuration 475).

In some aspects, incremental redundancy-combining over PSSCH may be provided. For example, in aspects, decoding the PSSCH transmission (e.g., PSSCH transmission 482) may be performed by combining the repeated PSSCH over the multiple opportunities of the at least one configured reception occasion. In these aspects, a redundancy value (RV) may be included in the SCI message (e.g., SCI message 481) for the associated PSSCH 482. In aspects, a same RV for all repetitions of the PSSCH transmission may be included in all repetitions of the SCI message. In aspects, incremental-redundancy combining over PSSCH repetitions may be provided by inserting a "dummy" RV in each SCI repetitions, and including an indication in the SCI repetitions of the "true" RV for each opportunity. In one aspects, the indication of the "true" RV for each opportunity may include a fixed RV pattern within a configured reception occasion. In this case, each SCI repetition may include an RV based on the fixed pattern of the configured reception occasion. In another aspect, the indication of the "true" RV for each opportunity may include a dynamic RV pattern in the SCI repetitions. In these aspects, a one-to-many mapping between the SCI and the PSSCH repetitions may be provided, whereas in current implementation a one-to-one mapping has been adopted.

In some aspects, a sidelink receiving UE and a sidelink transmitting UE may not be served by the same base station. In these aspects, a serving base station of the receiving UE may configure the receiving UE for configured reception with SCI repetition operations, and may then provide the configured reception configuration to the transmitting UE via the serving base station of the transmitting UE. In these aspects, the serving base station of the receiving UE may transmit an indication of the configured reception configuration of the receiving UE to the serving base station of the transmitting UE. The serving base station of the transmitting UE may then schedule the transmitting UE to transmit a sidelink transmission to the receiving UE in accordance with the configured reception configuration of the receiving UE. In this manner, with inter-base station cooperation, a transmitting UE may be scheduled to transmit to the configured reception of a receiving UE with SCI repetition in accordance with the present disclosure, even when the receiving UE is served by a different base station.

Figure 8:
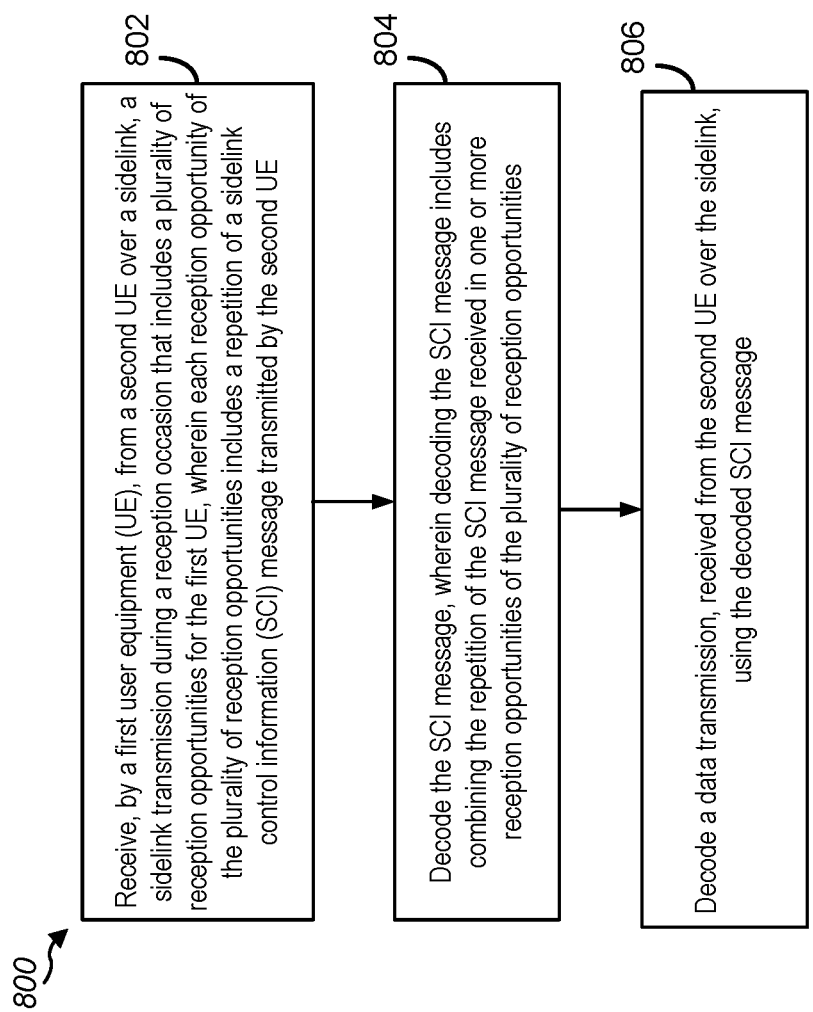
FIG. 8 is a flow diagram illustrating an example process 800 that supports configured reception with SCI repetition over a sidelink in a wireless communication system according to one or more aspects.
Figure 11:
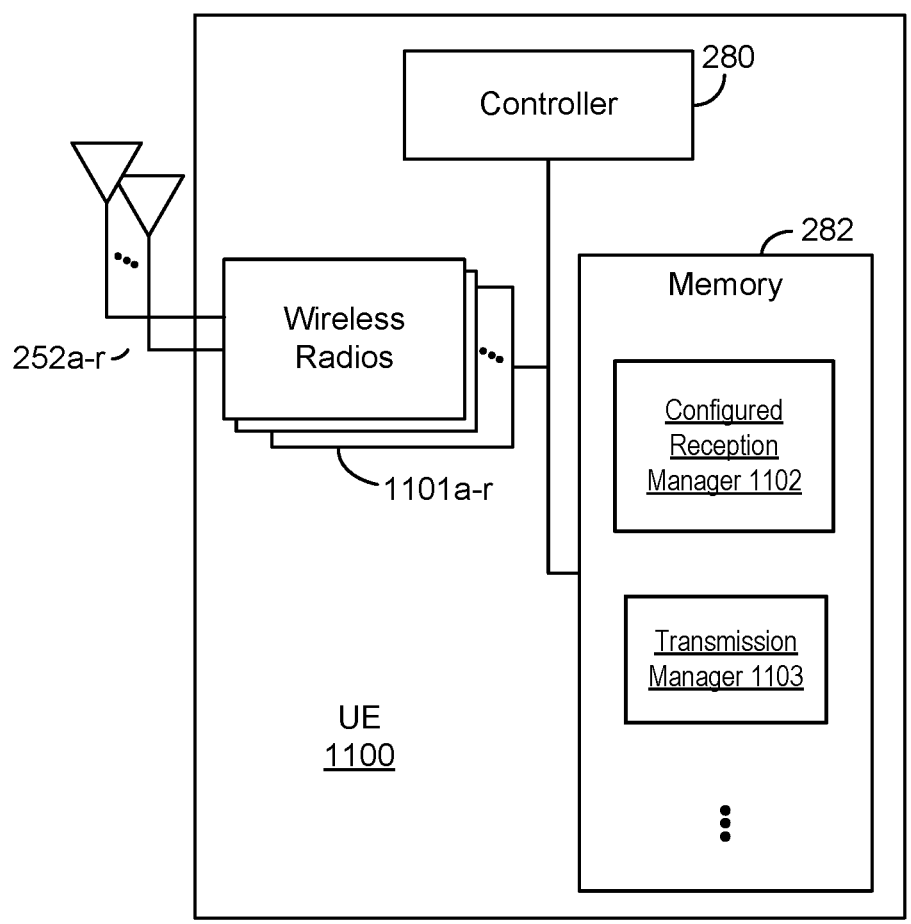
FIG. 11 is a block diagram of an example UE that supports configured reception with SCI repetition over a sidelink in a wireless communication system according to one or more aspects.

FIG. 8 is a flow diagram illustrating an example process 800 that supports configured reception with SCI repetition over a sidelink in a wireless communication system according to one or more aspects. Operations of process 800 may be performed by a UE, such as receiving sidelink UE 115*b* described above with reference to FIGS. 1-7, or UE 1100 described with reference to FIG. 11. For example, example operations (also referred to as "blocks") of process 800 may enable receiving sidelink UE 115*b* to support configured reception with SCI repetition over a sidelink. FIG. 11 is a block diagram illustrating UE 1100 configured according to aspects of the present disclosure. UE 1100 includes the structure, hardware, and components as illustrated for UE 115 of FIG. 2. For example, UE 1100 includes controller/processor 280, which operates to execute logic or computer instructions stored in memory 282, as well as controlling the components of UE 1100 that provide the features and functionality of UE 1100. UE 1100, under control of controller/processor 280, transmits and receives signals via wireless radios 1101*a-r* and antennas 252*a-r*. Wireless radios 1101*a-r* includes various components and hardware, as illustrated in FIG. 2 for UE 1100, including modulator/demodulators 254*a-r*, MIMO detector 256, receive processor 258, transmit processor 264, and TX MIMO processor 266.

At block 802 of process 800, a first UE (e.g., receiving UE 115*b*) receives from a second UE (e.g., transmitting UE 115*a*) over a sidelink, a sidelink transmission during a reception occasion that includes a plurality of reception opportunities for the first UE. For example, UE 1100 may receive the sidelink transmission during a reception occasion that includes a plurality of reception opportunities for the first UE from a second UE via wireless radios 1101*a-r* and antennas 252*a-r*. In aspects, each reception opportunity of the plurality of reception opportunities includes a repetition of an SCI message transmitted by the second UE. In aspects, each reception opportunity of the plurality of reception opportunities of a reception occasion may span a sub-channel of a plurality of sub-channel associated with the sidelink between the first UE and the second UE.

At block 804, the first UE (e.g., receiving UE 115*b*) decodes the SCI message. In order to implement the functionality for such operations, the first UE, under control of controller/processor 280, executes configured reception manager 1102, stored in memory 282. The functionality implemented through the execution environment of configured reception manager 1102 allows for the first UE to perform SCI decoding operations according to the various aspects herein. In aspects, the first UE may decode the SCI message by combining the repetitions of the SCI message received in one or more reception opportunities of the plurality of reception opportunities. In aspects, the repetition of the SCI message received in each reception opportunity of the plurality of reception opportunities may be copies of the SCI message and may each include the same SCI data. In these aspects, combining the repetitions of the SCI message may include calculating an LLR for each repetition of the SCI message, and combining the LLR for each repetition of the SCI message.

In aspects, the first UE may perform early SCI decoding of the SCI message. In these aspects, the first UE may decode at least one repetition of the SCI message received in at least one reception opportunity of the plurality of reception opportunities, may determine whether decoding the repetition of the SCI message received in the at least one reception opportunity results in a valid SCI message, and may continue decoding repetitions of the SCI message received in other reception opportunities of the plurality of reception opportunities when decoding the repetition of the SCI message received in the at least one reception opportunity is not determined to result in a valid SCI message. In aspects, the first UE may forego decoding repetitions of the SCI message received in other reception opportunities of the plurality of reception opportunities when decoding the repetition of the SCI message received in the at least one reception opportunity is determined to result in a valid SCI message. In aspects, the other reception opportunities may be different than the at least one reception opportunity. In aspects, the first UE may determine whether decoding the repetition of the SCI message received in the at least one reception opportunity results in a valid SCI message by determining whether the repetition of the SCI message received in the at least one reception opportunity includes a destination ID matching an L2 ID of the SCI message received in the at least one reception opportunity.

In aspects, decoding the SCI message may include measuring an RSRP of a reference signal for each reception opportunity of the plurality of reception opportunities, including, in a set of qualified reception opportunities, each reception opportunity of the plurality of reception opportunities whose reference signal has an RSRP larger than the RSRP threshold, and decoding the SCI message received in each reception opportunity of the set of qualified reception opportunities.

In some aspects, the first UE may receive configuration of periodic CR occasions for receiving sidelink transmissions from the second UE over the sidelink, and the first UE may use the configuration when receiving the SCI repetitions. In aspects, the periodic CR occasions include the reception occasion during which the sidelink transmission is received from the second UE, and may include a resource spectrum for each CR occasion of the periodic CR occasions. In aspects, the configuration of a CR occasion may specify the plurality of reception opportunities in which the SCI message is repeated within the CR occasion. In some aspects, the first UE may receive the configuration of periodic CR occasions via one or more of: an RRC message, and DL MAC-CE message, or a DCI message.

At block 806, the first UE (e.g., receiving UE 115*b*) decodes a data transmission, received from the second UE over the sidelink, using the decoded SCI message. In order to implement the functionality for such operations, the first UE, under control of controller/processor 280, executes configured reception manager 1102, stored in memory 282. The functionality implemented through the execution environment of configured reception manager 1102 allows for the first UE to perform data transmission (e.g., PSSCH transmission) decoding operations according to the various aspects herein. In aspects, the data transmission may include a PSSCH transmission from the second UE to the first UE. In aspects, such as when early deciding is used, the first UE may decode the data transmission using the valid SCI message.

In aspects, the first UE may transmit a HARQ feedback message for each repetition of the SCI message received in each reception opportunity of the set of qualified reception opportunities. In these aspects, transmitting the HARQ feedback message may include transmitting the HARQ feedback message for a first repetition of the SCI message received in a first reception opportunity of the set of qualified reception opportunities with a QCL source equal to a QCL associated with the first reception opportunity. In alternative aspects, transmitting the HARQ feedback message may include transmitting the HARQ feedback message for the first repetition of the SCI message with a QCL source equal to a QCL associated with a second reception opportunity. In aspects, the RSRP of a reference signal for the second reception opportunity may be larger than the RSRP of each reference signal for the remaining reception opportunities in the set of qualified reception opportunities.

In alternative or additional aspects, the first UE may transmit a single HARQ feedback message for all repetitions of the SCI message received in all reception opportunities of the set of qualified reception opportunities.

Figure 9:
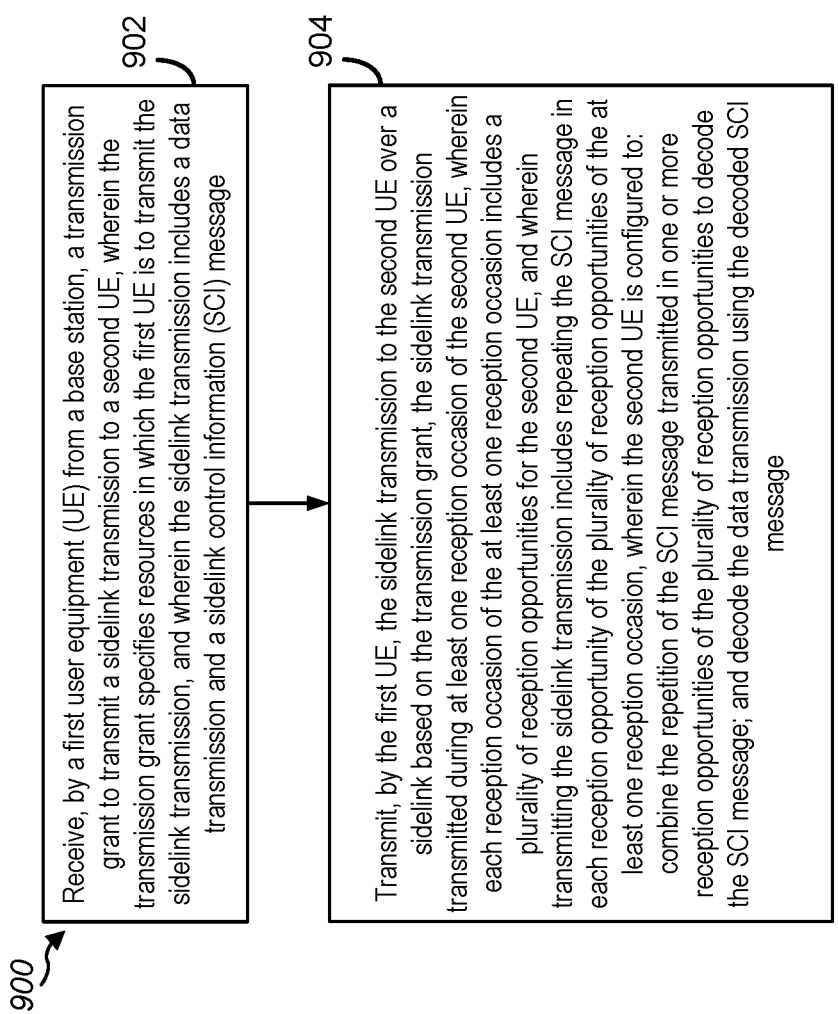
FIG. 9 is a flow diagram illustrating an example process that supports configured reception with SCI repetition over a sidelink in a wireless communication system according to one or more aspects.

FIG. 9 is a flow diagram illustrating an example process 900 that supports configured reception with SCI repetition over a sidelink in a wireless communication system according to one or more aspects. Operations of process 900 may be performed by a UE, such as transmitting sidelink UE 115*a* described above with reference to FIGS. 1-7, or UE 1100 described with reference to FIG. 11. For example, example operations (also referred to as "blocks") of process 1000 may enable UE 115*a* to support configured reception with SCI repetition over a sidelink.

At block 902 of process 900, a first UE (e.g., transmitting UE 115*a*), receives, from a base station, a transmission grant to transmit a sidelink transmission to a second UE. For example, UE 1100 may receive the transmission grant to transmit a sidelink transmission to the second UE via wireless radios 1101*a-r* and antennas 252*a-r*. In aspects, the transmission grant may specify resources in which the first UE is to transmit the sidelink transmission, and the sidelink transmission includes a data transmission and an SCI message.

In aspects, the transmission grant may include a configuration of periodic CR occasions configured for the second UE for receiving sidelink transmissions over the sidelink. The configuration of the periodic CR occasions may specify a resource spectrum for each CR occasion of the periodic CR occasions, and a plurality of reception opportunities configured for repeating the SCI message within the each CR occasion.

At block 904 of process 900, the first UE (e.g., transmitting UE 115*a*), transmits the sidelink transmission to the second UE over a sidelink based on the transmission grant, the sidelink transmission transmitted during at least one reception occasion of the second UE. In order to implement the functionality for such operations, the first UE, under control of controller/processor 280, executes transmission manager 1103, stored in memory 282. The functionality implemented through the execution environment of transmission manager 1103 allows for the first UE to perform sidelink transmission operations according to the various aspects herein.

In aspects, the sidelink transmission transmitted from the first UE to the second UE may include the data transmission (e.g., a PSSCH transmission) and the SCI message. In aspects, each reception occasion of the at least one reception occasion may include a plurality of reception opportunities for the second UE, and transmitting the sidelink transmission includes repeating the SCI message in each reception opportunity of the plurality of reception opportunities. In aspects, the second UE (e.g., the receiving UE, such as receiving UE 115*b*) may be configured to, as described above, to combine the repetition of the SCI message transmitted in one or more reception opportunities of the plurality of reception opportunities to decode the SCI message, and to decode the data transmission using the decoded SCI message.

In aspects, the transmission grant may include a plurality of DCI messages granting transmission of the sidelink transmission to the second UE during a plurality of reception occasions of the at least one reception occasion of the second UE, and the configuration of periodic CR occasions may be configured for the plurality of reception occasions. In these aspects, each DCI message of the plurality of DCI messages may be coupled to each other, and each DCI message may grant transmission of the sidelink transmission during a respective reception occasion of the at least one reception occasion. In aspects, the plurality of reception opportunities may span more than one reception occasion of the at least one reception occasion.

Figure 10:
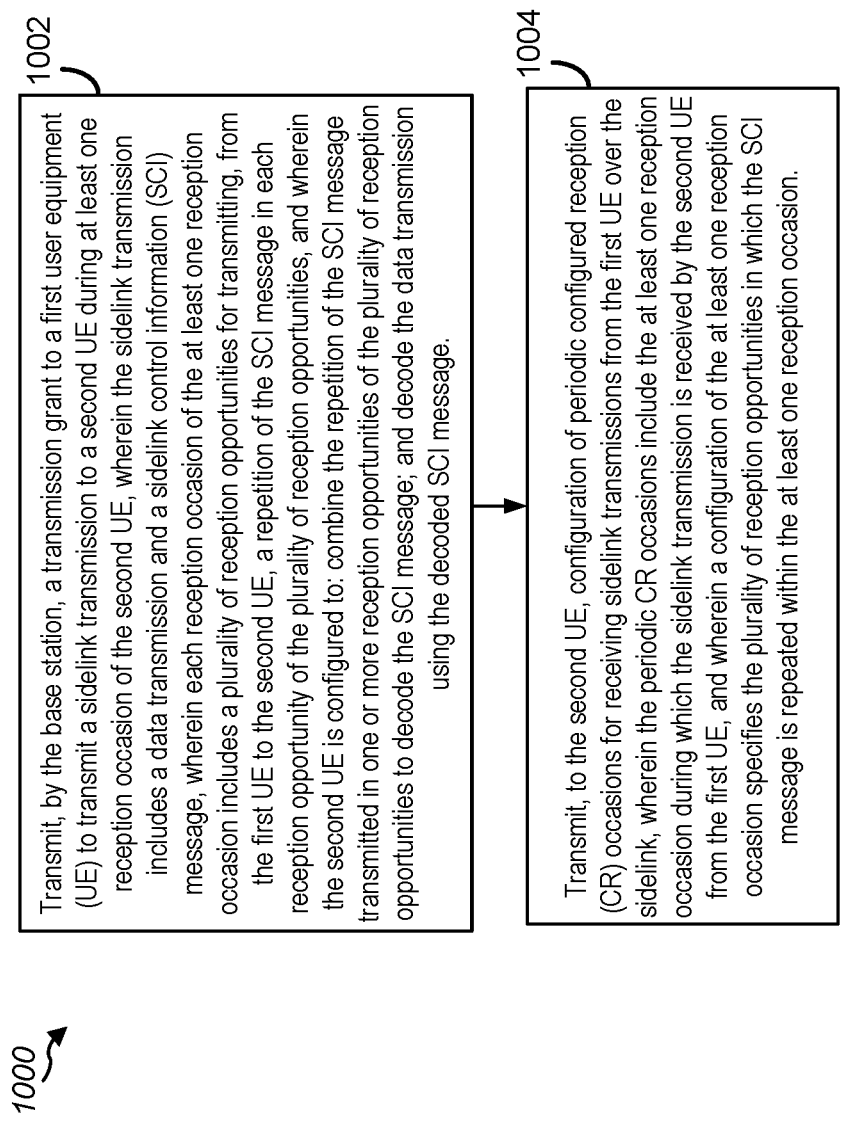
FIG. 10 is a block diagram illustrating an example an example process that that supports configured reception with SCI repetition over a sidelink in a wireless communication system according to one or more aspects.
Figure 12:
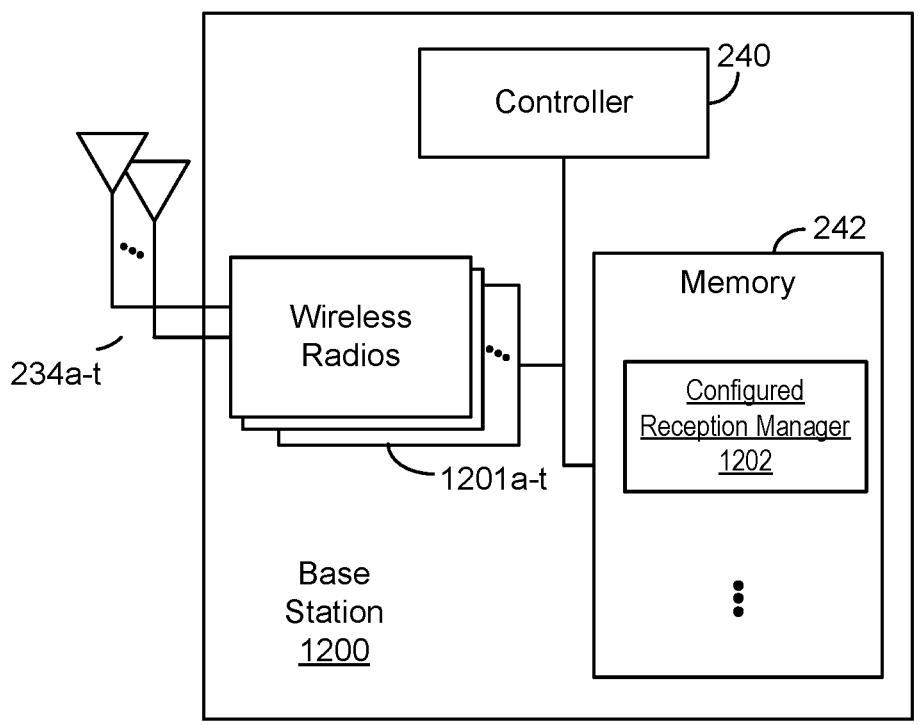
FIG. 12 is a block diagram of an example base station that supports configured reception with SCI repetition over a sidelink in a wireless communication system according to one or more aspects.

FIG. 10 is a block diagram illustrating an example an example process 1000 that that supports configured reception with SCI repetition over a sidelink in a wireless communication system according to one or more aspects. Operations of the process illustrated in FIG. 10 may be performed by a base station, such as base station 105 described above with reference to FIGS. 1-7, or base station 1200 described with reference to FIG. 12. FIG. 12 is a block diagram illustrating base station 105 configured according to one aspect of the present disclosure. Base station 1200 includes the structure, hardware, and components as illustrated for base station 105 of FIG. 2. For example, base station 1200 includes controller/processor 240, which operates to execute logic or computer instructions stored in memory 242, as well as controlling the components of base station 1200 that provide the features and functionality of base station 1200. Base station 1200, under control of controller/processor 240, transmits and receives signals via wireless radios 1201a-t and antennas 234a-t. Wireless radios 1201a-t includes various components and hardware, as illustrated in FIG. 2 for base station 105, including modulator/demodulators 232a-t, MIMO detector 236, receive processor 238, transmit processor 220, and TX MIMO processor 230.

At block 1002, a base station (e.g., base station 900) transmit, by the base station, a transmission grant to a first UE (e.g., a transmitting UE, such as transmitting UE 115a) to transmit a sidelink transmission to a second UE (e.g., a receiving UE, such as receiving UE 115b) during at least one reception occasion of the second UE. In order to implement the functionality for such operations, the base station, under control of controller/processor 240, executes configured reception manager 1202, stored in memory 242. The functionality implemented through the execution environment of configured reception manager 1202, allows for the base station to perform configured reception and transmission grant operations according to the various aspects herein. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities.

In aspects, the second UE (e.g., the receiving UE, such as receiving UE 115b) may be configured to, as described above, to combine the repetition of the SCI message transmitted in one or more reception opportunities of the plurality of reception opportunities to decode the SCI message, and to decode the data transmission using the decoded SCI message.

At optional block 1004, the base station (e.g., base station 900) transmits, to the second UE, a configuration of periodic CR occasions for receiving sidelink transmissions from the first UE over the sidelink. In order to implement the functionality for such operations, the base station, under control of controller/processor 240, executes configured reception manager 1202, stored in memory 242. The functionality implemented through the execution environment of configured reception manager 1202, allows for the base station to perform periodic CR occasions configuration related operations according to the various aspects herein. In aspects, the periodic CR occasions for which the configuration of periodic CR occasions is transmitted by the base station may include the at least one reception occasion during which the sidelink transmission is received by the second UE from the first UE. In some aspects, the configuration of the periodic CR occasions may specify the plurality of reception opportunities in which the SCI message is repeated within each of the CR occasions.

In aspects, the second UE may be served by another base station different than the base station. In these aspects, the base station may receive, from the other base station, a configuration for the second UE of periodic CR occasions for receiving sidelink transmissions from the first UE over the sidelink. In these aspects, periodic CR occasions may include the at least one reception occasion during which the sidelink transmission is received by the second UE from the first UE, and may specify the plurality of reception opportunities in which the SCI message is repeated within the reception occasions In one or more aspects, techniques for supporting configured reception with SCI repetition over a sidelink in a wireless communication system according to one or more aspects may include additional aspects, such as any single aspect or any combination of aspects described below or in connection with one or more other processes or devices described elsewhere herein. In a first aspect, supporting configured reception with SCI repetition over a sidelink in a wireless communication system may include an apparatus configured to receive, by a first UE, from a second UE over a sidelink, a sidelink transmission during a reception occasion that includes a plurality of reception opportunities for the first UE. In aspects, each reception opportunity of the plurality of reception opportunities includes a repetition of an SCI message transmitted by the second UE. The apparatus is further configured to decode the SCI message. In aspects, decoding the SCI message includes combining the repetition of the SCI message received in one or more reception opportunities of the plurality of reception opportunities. The apparatus is also configured to decode a data transmission, received from the second UE over the sidelink, using the decoded SCI message. Additionally, the apparatus may perform or operate according to one or more aspects as described below. In some implementations, the apparatus includes a wireless device, such as a UE (e.g., a receiving sidelink UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the techniques of the first aspect include receiving, from a base station, configuration of periodic CR occasions for receiving sidelink transmissions from the second UE over the sidelink.

In a third aspect, alone or in combination with the second aspect, the periodic CR occasions include the reception occasion during which the sidelink transmission is received from the second UE.

In a fourth aspect, alone or in combination with one or more of the second aspect through the third aspect, the configuration of the periodic CR occasions includes a resource spectrum for each CR occasion of the periodic CR occasions.

In a fifth aspect, alone or in combination with one or more of the second aspect through the fourth aspect, a configuration of a CR occasion specifies the plurality of reception opportunities in which the SCI message is repeated within the CR occasion.

In a sixth aspect, alone or in combination with one or more of the first aspect through the fifth aspect, the configuration of the periodic CR occasions is received by the first UE via one or more of an RRC message, and DL MAC-CE message, or a DCI message.

In a seventh aspect, alone or in combination with one or more of the first aspect through the sixth aspect, each reception opportunity of the plurality of reception opportunities spans a sub-channel of a plurality of sub-channel associated with the sidelink.

In an eighth aspect, alone or in combination with one or more of the first aspect through the seventh aspect, the data transmission is received from the second UE over a PSSCH.

In a ninth aspect, alone or in combination with one or more of the first aspect through the eighth aspect, the repetition of the SCI message received in each reception opportunity of the plurality of reception opportunities includes a same SCI data.

In a tenth aspect, alone or in combination with the ninth aspect, combining the repetition of the SCI message includes calculating an LLR for each repetition of the SCI message.

In an eleventh aspect, alone or in combination with one or more of the ninth aspect through the tenth aspect, combining the repetition of the SCI message includes combining the LLR for each repetition of the SCI message.

In a twelfth aspect, alone or in combination with one or more of the first aspect through the eleventh aspect, decoding the SCI message includes decoding at least one repetition of the SCI message received in at least one reception opportunity of the plurality of reception opportunities.

In a thirteenth aspect, alone or in combination with the twelfth aspect, decoding the SCI message includes determining whether decoding the repetition of the SCI message received in the at least one reception opportunity results in a valid SCI message.

In a fourteenth aspect, alone or in combination with one or more of the twelfth aspect through the thirteenth aspect, decoding the SCI message includes continuing decoding repetitions of the SCI message received in other reception opportunities of the plurality of reception opportunities when decoding the repetition of the SCI message received in the at least one reception opportunity is not determined to result in a valid SCI message.

In a fifteenth aspect, alone or in combination with one or more of the twelfth aspect through the fourteenth aspect, decoding the SCI message includes foregoing decoding repetitions of the SCI message received in other reception opportunities of the plurality of reception opportunities when decoding the repetition of the SCI message received in the at least one reception opportunity is determined to result in a valid SCI message.

In a sixteenth aspect, alone or in combination with one or more of the twelfth aspect through the fifteenth aspect, the other reception opportunities are different than the at least one reception opportunity.

In a seventeenth aspect, alone or in combination with one or more of the first aspect through the sixteenth aspect, wherein determining whether decoding the repetition of the SCI message received in the at least one reception opportunity results in a valid SCI message includes determining whether the repetition of the SCI message received in the at least one reception opportunity includes a destination ID matching an L2 ID of the SCI message received in the at least one reception opportunity.

In an eighteenth aspect, alone or in combination with one or more of the first aspect through the seventeenth aspect, decoding the data transmission includes decoding the data transmission using the valid SCI message.

In a nineteenth aspect, alone or in combination with the eighteenth aspect, the data transmission is a transmission over a shared channel associated with the valid SCI message.

In a twentieth aspect, alone or in combination with one or more of the first aspect through the nineteenth aspect, a first repetition of the SCI message received in a first reception opportunity includes a first value for a reservation field of the SCI message.

In a twenty-first aspect, alone or in combination with the twentieth aspect, a second repetition of the SCI message received in a second reception opportunity includes a second value for the reservation field of the SCI message.

In a twenty-second aspect, alone or in combination with one or more of the twentieth aspect through the twenty-first aspect, when a number of repetitions of the SCI message included in the plurality of reception opportunities exceeds a reliability threshold, the first value for the reservation field of the SCI message and the second value for the reservation field of the SCI message include a null value, or when the number of repetitions of the SCI message included in the plurality of reception opportunities does not exceed the reliability threshold, the first value for the reservation field of the SCI message and the second value for the reservation field of the SCI message include a same reservation value that is equal to a reservation value of an anchor reception opportunity of the plurality of reception opportunities.

In a twenty-third aspect, alone or in combination with one or more of the first aspect through the twenty-second aspect, the number of repetitions of the SCI message included in the plurality of reception opportunities does not exceed the reliability threshold.

In a twenty-fourth aspect, alone or in combination with the twenty-third aspect, the reservation value of the anchor reception opportunity is a reservation value of a default anchor reception opportunity.

In a twenty-fifth aspect, alone or in combination with one or more of the twenty-third aspect through the twenty-fourth aspect, the techniques of the first aspect include overriding the reservation value of the default anchor reception opportunity with an active reservation value in the SCI message.

In a twenty-sixth aspect, alone or in combination with one or more of the first aspect through the twenty-fifth aspect, decoding the SCI message includes measuring an RSRP of a reference signal for each reception opportunity of the plurality of reception opportunities.

In a twenty-seventh aspect, alone or in combination with the twenty-sixth aspect, decoding the SCI message includes including, in a set of qualified reception opportunities, each reception opportunity of the plurality of reception opportunities whose reference signal has an RSRP larger than the RSRP threshold.

In a twenty-eighth aspect, alone or in combination with one or more of the twenty-sixth aspect through the twenty-seventh aspect, decoding the SCI message includes decoding the SCI message received in each reception opportunity of the set of qualified reception opportunities.

In a twenty-ninth aspect, alone or in combination with one or more of the first aspect through the twenty-eighth aspect, the techniques of the first aspect include transmitting a HARQ feedback message for each repetition of the SCI message received in each reception opportunity of the set of qualified reception opportunities.

In a thirtieth aspect, alone or in combination with one or more of the first aspect through the twenty-ninth aspect, transmitting the HARQ feedback message for each repetition of the SCI message received in each reception opportunity of the set of qualified reception opportunities includes transmitting the HARQ feedback message for a first repetition of the SCI message received in a first reception opportunity of the set of qualified reception opportunities with a QCL source equal to a QCL associated with the first reception opportunity.

In a thirty-first aspect, alone or in combination with the thirtieth aspect, transmitting the HARQ feedback message for each repetition of the SCI message received in each reception opportunity of the set of qualified reception opportunities includes transmitting the HARQ feedback message for the first repetition of the SCI message with a QCL source equal to a QCL associated with a second reception opportunity.

In a thirty-second aspect, alone or in combination with one or more of the thirtieth aspect through the thirty-first aspect, the RSRP of a reference signal for the second reception opportunity is larger than the RSRP of each reference signal for the remaining reception opportunities in the set of qualified reception opportunities.

In a thirty-third aspect, alone or in combination with one or more of the first aspect through the thirty-second aspect, transmitting a single hybrid automatic repeat request (HARQ) message for all repetitions of the SCI message received in all reception opportunities of the set of qualified reception opportunities transmitting a single HARQ message for all repetitions of the SCI message received in all reception opportunities of the set of qualified reception opportunities.

In a thirty-fourth aspect, alone or in combination with one or more of the first aspect through the thirty-fourth aspect, transmitting the single HARQ message for all repetitions of the SCI message received in all reception opportunities of the set of qualified reception opportunities includes transmitting the single HARQ message at the earliest feedback opportunity during the reception occasion after decoding the SCI message.

In a thirty-fifth aspect, alone or in combination with the thirty-third aspect, transmitting the single HARQ message for all repetitions of the SCI message received in all reception opportunities of the set of qualified reception opportunities includes transmitting the single HARQ message at the last feedback opportunity during the reception occasion after decoding the SCI message.

In a thirty-sixth aspect, alone or in combination with one or more of the thirty-third aspect through the thirty-fifth aspect, a feedback opportunity includes a predefined resource configured for a feedback transmission from the first UE.

In a thirty-seventh aspect, techniques for supporting configured reception with SCI repetition over a sidelink in a wireless communication system may include an apparatus configured to receive, by a first UE from a base station, a transmission grant to transmit a sidelink transmission to a second UE. In aspects, the transmission grant specifies resources in which the first UE is to transmit the sidelink transmission, and the sidelink transmission includes a data transmission and an SCI message. The apparatus may also be configured to transmit the sidelink transmission to the second UE over a sidelink based on the transmission grant, the sidelink transmission transmitted during at least one reception occasion of the second UE. In aspects, each reception occasion of the at least one reception occasion includes a plurality of reception opportunities for the second UE, and transmitting the sidelink transmission includes repeating the SCI message in each reception opportunity of the plurality of reception opportunities of the at least one reception occasion. In aspects, the second UE is configured to combine the repetition of the SCI message transmitted in one or more reception opportunities of the plurality of reception opportunities to decode the SCI message, and to decode the data transmission using the decoded SCI message. Additionally, the apparatus may perform or operate according to one or more aspects as described below. In some implementations, the apparatus includes a wireless device, such as a UE (e.g., a transmitting sidelink UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-eighth aspect, alone or in combination with one or more of the thirty-eighth aspect through the thirty-seventh aspect, the transmission grant includes a configuration of periodic CR occasions configured for the second UE for receiving sidelink transmissions over the sidelink.

In a thirty-ninth aspect, alone or in combination with the thirty-eighth aspect, the configuration of the periodic CR occasions includes a resource spectrum for each CR occasion of the periodic CR occasions.

In a fortieth aspect, alone or in combination with one or more of the thirty-eighth aspect through the thirty-ninth aspect, a configuration of the at least one CR occasion specifies the plurality of reception opportunities configured for repeating the SCI message within the at least one CR occasion.

In a forty-first aspect, alone or in combination with one or more of the thirty-seventh aspect through the fortieth aspect, transmitting the sidelink transmission to the second UE over the sidelink during the at least one reception occasion of the second UE includes repeating the SCI message in each reception opportunity of the plurality of reception opportunities of the at least one reception occasion specified in the configuration of the periodic CR occasions in the transmission grant received from the base station.

In a forty-second aspect, alone or in combination with one or more of the thirty-seventh aspect through the forty-first aspect, the transmission grant includes a single DCI message granting transmission of the sidelink transmission to the second UE during a single reception occasion of the at least one reception occasion of the second UE.

In a forty-third aspect, alone or in combination with the forty-second aspect, the configuration of periodic CR occasions is configured for the single reception occasion.

In a forty-fourth aspect, alone or in combination with one or more of the thirty-seventh aspect through the forty-third aspect, the single DCI message includes an indication for the first UE to insert a null value in a reservation field of each repetition of the SCI message repeated in each reception opportunity of the plurality of reception opportunities, when a number of repetitions of the SCI message included in the plurality of reception opportunities exceeds a reliability threshold.

In a forty-fifth aspect, alone or in combination with one or more of the thirty-seventh aspect through the forty-fourth aspect, the single DCI message includes an indication for the first UE to insert a reservation value of an anchor reception opportunity of the plurality of reception opportunities in the reservation field of each repetition of the SCI message, when a number of repetitions of the SCI message included in the plurality of reception opportunities exceeds a reliability threshold.

In a forty-sixth aspect, alone or in combination with one or more of the thirty-seventh aspect through the forty-fifth aspect, the transmission grant includes a plurality of DCI messages granting transmission of the sidelink transmission to the second UE during a plurality of reception occasions of the at least one reception occasion of the second UE.

In a forty-seventh aspect, alone or in combination with the forty-sixth aspect, the configuration of periodic CR occasions is configured for the plurality of reception occasions.

In a forty-eighth aspect, alone or in combination with one or more of the thirty-seventh aspect through the forty-seventh aspect, each DCI message of the plurality of DCI messages is coupled to each other, each DCI message granting transmission of the sidelink transmission during a respective reception occasion of the at least one reception occasion.

In a forty-ninth aspect, alone or in combination with the forty-eighth aspect, the plurality of reception opportunities spans more than one reception occasion of the at least one reception occasion.

In a fiftieth aspect, supporting configured reception with SCI repetition over a sidelink in a wireless communication system may include an apparatus configured to transmit a transmission grant to a first UE to transmit a sidelink transmission to a second UE during at least one reception occasion of the second UE. In aspects, the sidelink transmission includes a data transmission and an SCI message, and each reception occasion of the at least one reception occasion includes a plurality of reception opportunities for transmitting, from the first UE to the second UE, a repetition of the SCI message in each reception opportunity of the plurality of reception opportunities. In aspects, the second UE is configured to combine the repetition of the SCI message transmitted in one or more reception opportunities of the plurality of reception opportunities to decode the SCI message, and to decode the data transmission using the decoded SCI message. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a fifty-first aspect, alone or in combination with one or more of the fiftieth aspect through the fiftieth aspect, the techniques of the fiftieth aspect include transmitting, to the second UE, configuration of periodic CR occasions for receiving sidelink transmissions from the first UE over the sidelink.

In a fifty-second aspect, alone or in combination with the fifty-first aspect, the periodic CR occasions include the at least one reception occasion during which the sidelink transmission is received by the second UE from the first UE.

In a fifty-third aspect, alone or in combination with one or more of the fifty-first aspect through the fifty-second aspect, a configuration of the at least one reception occasion specifies the plurality of reception opportunities in which the SCI message is repeated within the at least one reception occasion.

In a fifty-fourth aspect, alone or in combination with one or more of the fiftieth aspect through the fifty-third aspect, the transmission grant includes a single DCI message granting the first UE transmission of the sidelink transmission to the second UE during a single reception occasion of the at least one reception occasion of the second UE.

In a fifty-fifth aspect, alone or in combination with the fifty-fourth aspect, the configuration of periodic CR occasions is configured for the single reception occasion.

In a fifty-sixth aspect, alone or in combination with one or more of the fiftieth aspect through the fifty-fifth aspect, the techniques of the fiftieth aspect include including an indication in the single DCI message for the first UE to insert a null value in a reservation field of each repetition of the SCI message repeated in each reception opportunity of the plurality of reception opportunities, when a number of repetitions of the SCI message included in the plurality of reception opportunities exceeds a reliability threshold.

In a fifty-seventh aspect, alone or in combination with the fifty-sixth aspect, the techniques of the fiftieth aspect include including an indication in the single DCI message for the first UE to insert a reservation value of an anchor reception opportunity of the plurality of reception opportunities in the reservation field of each repetition of the SCI message, when a number of repetitions of the SCI message included in the plurality of reception opportunities exceeds a reliability threshold.

In a fifty-eighth aspect, alone or in combination with one or more of the fiftieth aspect through the fifty-seventh aspect, the transmission grant includes a plurality of DCI messages granting the first UE transmission of the sidelink transmission to the second UE during a plurality of reception occasions of the at least one reception occasion of the second UE.

In a fifty-ninth aspect, alone or in combination with the fifty-eighth aspect, the configuration of periodic CR occasions is configured for the plurality of reception occasions.

In a sixtieth aspect, alone or in combination with one or more of the fiftieth aspect through the fifty-ninth aspect, the techniques of the fiftieth aspect include coupling each DCI message of the plurality of DCI messages to each other, each DCI message granting transmission of the sidelink transmission during a respective reception occasion of the at least one reception occasion.

In a sixty-first aspect, alone or in combination with the sixtieth aspect, the plurality of reception opportunities spans more than one reception occasion of the at least one reception occasion.

In a sixty-second aspect, alone or in combination with one or more of the fiftieth aspect through the sixty-first aspect, the second UE is served by another base station different than the base station.

In a sixty-third aspect, alone or in combination with the sixty-second aspect, the techniques of the fiftieth aspect include receiving, from the another base station, a configuration for the second UE of periodic CR occasions for receiving sidelink transmissions from the first UE over the sidelink.

In a sixty-fourth aspect, alone or in combination with one or more of the sixty-second aspect through the sixty-third aspect, the periodic CR occasions include the at least one reception occasion during which the sidelink transmission is received by the second UE from the first UE.

In a sixty-fifth aspect, alone or in combination with one or more of the sixty-second aspect through the sixty-fourth aspect, a configuration of the at least one reception occasion specifies the plurality of reception opportunities in which the SCI message is repeated within the at least one reception occasion.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   receiving, by a first user equipment (UE), from a second UE over a sidelink, a sidelink transmission during a reception occasion that includes a plurality of reception opportunities for the first UE, wherein each reception opportunity of the plurality of reception opportunities includes a repetition of a sidelink control information (SCI) message transmitted by the second UE;
   decoding the SCI message, wherein decoding the SCI message includes combining the repetition of the SCI message received in one or more reception opportunities of the plurality of reception opportunities, and wherein combining the repetition of the SCI message includes combining a log-likelihood ratio (LLR) calculated for each repetition of the SCI message; and
   decoding a data transmission, received from the second UE over the sidelink, using the decoded SCI message.

2. The method of claim 1, further comprising:
   receiving, from a base station, configuration of periodic configured reception (CR) occasions for receiving sidelink transmissions from the second UE over the sidelink, wherein the periodic CR occasions include the reception occasion during which the sidelink transmission is received from the second UE, wherein the configuration of the periodic CR occasions includes a resource spectrum for each CR occasion of the periodic CR occasions, and wherein a configuration of a CR occasion specifies the plurality of reception opportunities in which the SCI message is repeated within the CR occasion.

3. The method of claim 2, wherein the configuration of the periodic CR occasions is received by the first UE via a radio resource control (RRC) message or a downlink (DL) medium access control (MAC) control element (CE) message.

4. The method of claim 1, wherein each reception opportunity of the plurality of reception opportunities spans a sub-channel of a plurality of sub-channel associated with the sidelink, and wherein the data transmission is received from the second UE over a physical sidelink shared channel (PSSCH).

5. The method of claim 1, wherein the repetition of the SCI message received in each reception opportunity of the plurality of reception opportunities includes a same SCI data, and wherein combining the repetition of the SCI message includes:
   calculating a log-likelihood ratio (LLR) for each repetition of the SCI message.

6. The method of claim 1, wherein decoding the SCI message includes:
   decoding at least one repetition of the SCI message received in at least one reception opportunity of the plurality of reception opportunities; and determining whether decoding the repetition of the SCI message received in the at least one reception opportunity results in a valid SCI message, wherein:
in response to determining that decoding the repetition of the SCI message received in the at least one reception opportunity does not result in a valid SCI message, continuing decoding repetitions of the SCI message received in other reception opportunities of the plurality of reception opportunities, or
in response to determining that decoding the repetition of the SCI message received in the at least one reception opportunity results in a valid SCI message, foregoing decoding repetitions of the SCI message received in other reception opportunities of the plurality of reception opportunities, and
the other reception opportunities are different than the at least one reception opportunity.

7. The method of claim 6, wherein determining whether decoding the repetition of the SCI message received in the at least one reception opportunity results in a valid SCI message includes:
determining whether the repetition of the SCI message received in the at least one reception opportunity includes a destination identification (ID) matching a layer-2 (L2) ID of the SCI message received in the at least one reception opportunity.

8. The method of claim 6, wherein decoding the data transmission includes:
decoding the data transmission using the valid SCI message, wherein the data transmission is a transmission over a shared channel associated with the valid SCI message.

9. The method of claim 1, wherein a first repetition of the SCI message received in a first reception opportunity includes a first value for a reservation field of the SCI message, wherein a second repetition of the SCI message received in a second reception opportunity includes a second value for the reservation field of the SCI message, and wherein one of:
when a number of repetitions of the SCI message included in the plurality of reception opportunities exceeds a reliability threshold, the first value for the reservation field of the SCI message and the second value for the reservation field of the SCI message include a null value; or
when the number of repetitions of the SCI message included in the plurality of reception opportunities does not exceed the reliability threshold, the first value for the reservation field of the SCI message and the second value for the reservation field of the SCI message include a same reservation value that is equal to a reservation value of an anchor reception opportunity of the plurality of reception opportunities.

10. The method of claim 9, wherein the number of repetitions of the SCI message included in the plurality of reception opportunities does not exceed the reliability threshold, wherein the reservation value of the anchor reception opportunity is a reservation value of a default anchor reception opportunity, and further comprising:
overriding the reservation value of the default anchor reception opportunity with an active reservation value in the SCI message.

11. The method of claim 1, wherein decoding the SCI message includes:
measuring a reference signal received power (RSRP) of a reference signal for each reception opportunity of the plurality of reception opportunities;
including, in a set of qualified reception opportunities, each reception opportunity of the plurality of reception opportunities whose reference signal has an RSRP larger than an RSRP threshold; and
decoding the SCI message received in each reception opportunity of the set of qualified reception opportunities.

12. The method of claim 11, further comprising:
transmitting a hybrid automatic repeat request (HARQ) feedback message for each repetition of the SCI message received in each reception opportunity of the set of qualified reception opportunities.

13. The method of claim 12, wherein transmitting the HARQ feedback message for each repetition of the SCI message received in each reception opportunity of the set of qualified reception opportunities includes:
transmitting the HARQ feedback message for a first repetition of the SCI message received in a first reception opportunity of the set of qualified reception opportunities with a quasi-colocation (QCL) source equal to a QCL associated with the first reception opportunity; or
transmitting the HARQ feedback message for the first repetition of the SCI message with a QCL source equal to a QCL associated with a second reception opportunity, wherein the RSRP of a reference signal for the second reception opportunity is larger than the RSRP of each reference signal for the remaining reception opportunities in the set of qualified reception opportunities.

14. The method of claim 11, further comprising:
transmitting a single hybrid automatic repeat request (HARQ) message for all repetitions of the SCI message received in all reception opportunities of the set of qualified reception opportunities.

15. The method of claim 14, wherein transmitting the single HARQ message for all repetitions of the SCI message received in all reception opportunities of the set of qualified reception opportunities includes one or more of:
transmitting the single HARQ message at the earliest feedback opportunity during the reception occasion after decoding the SCI message; or
transmitting the single HARQ message at the last feedback opportunity during the reception occasion after decoding the SCI message, wherein a feedback opportunity includes a predefined resource configured for a feedback transmission from the first UE.

16. The method of claim 1, wherein the repetition of the SCI message received in each reception opportunity of the plurality of reception opportunities includes a same SCI data.

17. The method of claim 1, wherein combining the repetition of the SCI message includes:
calculating a log-likelihood ratio (LLR) for each repetition of the SCI message.

18. The method of claim 1, wherein a first repetition of the SCI message received in a first reception opportunity includes a first value for a reservation field of the SCI message, wherein a second repetition of the SCI message received in a second reception opportunity includes a second value for the reservation field of the SCI message.

19. The method of claim 1, wherein:
the sidelink transmission includes a physical sidelink shared channel (PSSCH) and the SCI message,
each reception opportunity of the plurality of reception opportunities includes a repetition of the PSSCH, a redundancy value (RV) is included in each SCI message associated with a corresponding PSSCH, and the same RV value is included in each repeated PSSCH.

20. A method of wireless communication, the method comprising:

receiving, by a first user equipment (UE) from a base station, a transmission grant to transmit a sidelink transmission to a second UE, wherein the transmission grant specifies resources in which the first UE is to transmit the sidelink transmission, and wherein the sidelink transmission includes a data transmission and a sidelink control information (SCI) message;

transmitting, by the first UE, the sidelink transmission to the second UE over a sidelink based on the transmission grant, the sidelink transmission transmitted during at least one reception occasion of the second UE, wherein each reception occasion of the at least one reception occasion includes a plurality of reception opportunities for the second UE, and wherein transmitting the sidelink transmission includes:

repeating the SCI message in each reception opportunity of the plurality of reception opportunities of the at least one reception occasion, wherein the second UE is configured to:

combine the repetition of the SCI message transmitted in one or more reception opportunities of the plurality of reception opportunities to decode the SCI message, wherein, to combine the repetition of the SCI message, the second UE is configured to combine a log-likelihood ration (LLR) calculated for each repetition of the SCI message; and decode the data transmission using the decoded SCI message.

21. The method of claim 20, wherein the transmission grant includes a configuration of periodic configured reception (CR) occasions configured for the second UE for receiving sidelink transmissions over the sidelink, wherein the configuration of the periodic CR occasions includes a resource spectrum for each CR occasion of the periodic CR occasions, and wherein a configuration of an at least one CR occasion specifies the plurality of reception opportunities configured for repeating the SCI message within the at least one CR occasion.

22. The method of claim 21, wherein transmitting the sidelink transmission to the second UE over the sidelink during the at least one reception occasion of the second UE includes:

repeating the SCI message in each reception opportunity of the plurality of reception opportunities of the at least one reception occasion specified in the configuration of the periodic CR occasions in the transmission grant received from the base station.

23. The method of claim 21, wherein:

the transmission grant includes a plurality of downlink control information (DCI) messages granting transmission of the sidelink transmission to the second UE during a plurality of reception occasions of the at least one reception occasion of the second UE, the configuration of periodic CR occasions is configured for the plurality of reception occasions, each DCI message of the plurality of DCI messages is coupled to each other, each DCI message granting transmission of the sidelink transmission during a respective reception occasion of the at least one reception occasion, and the plurality of reception opportunities spans more than one reception occasion of the at least one reception occasion.

24. The method of claim 20, wherein:

the transmission grant includes a single downlink control information (DCI) message granting transmission of the sidelink transmission to the second UE during a single reception occasion of the at least one reception occasion of the second UE, and the single DCI message includes an indication for the first UE to:

insert a null value in a reservation field of each repetition of the SCI message repeated in each reception opportunity of the plurality of reception opportunities, when a number of repetitions of the SCI message included in the plurality of reception opportunities exceeds a reliability threshold; or insert a reservation value of an anchor reception opportunity of the plurality of reception opportunities in the reservation field of each repetition of the SCI message, when a number of repetitions of the SCI message included in the plurality of reception opportunities exceeds a reliability threshold.

25. A method of wireless communication, the method comprising:

transmitting, by a base station, a transmission grant to a first user equipment (UE) to transmit a sidelink transmission to a second UE during at least one reception occasion of the second UE, wherein the sidelink transmission includes a data transmission and a sidelink control information (SCI) message, wherein each reception occasion of the at least one reception occasion includes a plurality of reception opportunities for transmitting, from the first UE to the second UE, a repetition of the SCI message in each reception opportunity of the plurality of reception opportunities, and wherein the second UE is configured to:

combine the repetition of the SCI message transmitted in one or more reception opportunities of the plurality of reception opportunities to decode the SCI message, wherein, to combine the repetition of the SCI message, the second UE is configured to combine a log-likelihood ration (LLR) calculated for each repetition of the SCI message; and decode the data transmission using the decoded SCI message.

26. The method of claim 25, further comprising:

transmitting, to the second UE, configuration of periodic configured reception (CR) occasions for receiving sidelink transmissions from the first UE over the sidelink, wherein the periodic CR occasions include the at least one reception occasion during which the sidelink transmission is received by the second UE from the first UE, and wherein a configuration of the at least one reception occasion specifies the plurality of reception opportunities in which the SCI message is repeated within the at least one reception occasion.

27. The method of claim 26, wherein the transmission grant includes a plurality of downlink control information (DCI) messages granting the first UE transmission of the sidelink transmission to the second UE during a plurality of reception occasions of the at least one reception occasion of the second UE, and wherein the configuration of periodic CR occasions is configured for the plurality of reception occasions.

28. The method of claim 27, further comprising:
coupling each DCI message of the plurality of DCI messages to each other, each DCI message granting transmission of the sidelink transmission during a respective reception occasion of the at least one reception occasion, wherein the plurality of reception opportunities spans more than one reception occasion of the at least one reception occasion.

29. The method of claim 25, wherein the transmission grant includes a single downlink control information (DCI) message granting the first UE transmission of the sidelink transmission to the second UE during a single reception occasion of the at least one reception occasion of the second UE, the method further comprising including an indication in the single DCI message for the first UE to:
insert a null value in a reservation field of each repetition of the SCI message repeated in each reception opportunity of the plurality of reception opportunities, when a number of repetitions of the SCI message included in the plurality of reception opportunities exceeds a reliability threshold; or
insert a reservation value of an anchor reception opportunity of the plurality of reception opportunities in the reservation field of each repetition of the SCI message, when a number of repetitions of the SCI message included in the plurality of reception opportunities exceeds a reliability threshold.

30. The method of claim 25, wherein the second UE is served by another base station different than the base station, and further comprising:
receiving, from the another base station, a configuration for the second UE of periodic configured reception (CR) occasions for receiving sidelink transmissions from the first UE over the sidelink, wherein the periodic CR occasions include the at least one reception occasion during which the sidelink transmission is received by the second UE from the first UE, and wherein a configuration of the at least one reception occasion specifies the plurality of reception opportunities in which the SCI message is repeated within the at least one reception occasion.

* * * * *